United States Patent [19]

Steinberg et al.

[11] Patent Number: 5,301,270
[45] Date of Patent: Apr. 5, 1994

[54] COMPUTER-ASSISTED SOFTWARE ENGINEERING SYSTEM FOR COOPERATIVE PROCESSING ENVIRONMENTS

[75] Inventors: Steven G. Steinberg; Elizabeth A. Zucker, both of New York, N.Y.; Yannis S. Arvanitis, Chicago, Ill.; Anil R. Bakshi, Bogota, N.J.; Matthew W. Olenich, New York, N.Y.; Thomas G. Werner, Jersey City, N.J.; Carl. G. Longnecker, Jr, Glencoe; Bart Schutte, Chicago, both of Ill.; William D. Reynolds, Medford, N.J.

[73] Assignee: Anderson Consulting, Chicago, Ill.

[21] Appl. No.: 452,673

[22] Filed: Dec. 18, 1989

[51] Int. Cl.⁵ .............................................. G06F 15/62
[52] U.S. Cl. ..................................................... 395/161
[58] Field of Search ............................... 395/155–161, 395/144–149, 650

[56] References Cited

U.S. PATENT DOCUMENTS

| | | | |
|---|---|---|---|
| 4,488,331 | 7/1984 | Amezcua et al. | 395/155 X |
| 4,688,167 | 8/1987 | Agarwal | 395/155 X |
| 4,953,080 | 8/1990 | Dysant et al. | 364/200 |
| 4,984,180 | 1/1991 | Wada et al. | 395/156 X |
| 5,008,853 | 4/1991 | Bly et al. | 395/157 X |
| 5,123,086 | 6/1992 | Tanaka et al. | 395/155 |

OTHER PUBLICATIONS

Arthur Andersen & Co., "Method/1 ®, Optimizing Systems Development Through Automated Methodology and Project Management", 1988.
Arthur Andersen & Co., "Design/1 ® Enhancing Your Systems Analysis And Design Potential Through Automated Design", 1988.
Arthur Andersen & Co., "Foundation ®–Design/1 ®, General Description Version 4.1", 1988.
Arthur Andersen & Co., "Install/1 ®, Managing Systems Implementation and Support Through Automated Application Generation", 1988.
Arthur Andersen & Co., "Install/1 ®–PC", 1989.
Arthur Andersen & Co., "Foundation ®–Install/1 ®, General Description Version 1.2", 1989.
H. Edelstein, "Cooperative Options Expanding in Number", Sofware Magazine, Dec. 1989, pp. 39–46.
P. C. Tinnirello, "Handbook of Systems Management Development and Support", 1989, pp. 287–311.
N. Nilekani, "It'll Fly With A Little Help From Its Friends", Computerworld, Feb. 20, 1989, pp. 75–78.
B. Francis, "Client/Server: The Model For The 90's", Datamation, Feb. 15, 1990, pp. 34–40.
Carma McClure, "Case Is Software Automation", Prentice Hall, 1989.

Primary Examiner—Heather R. Herndon
Attorney, Agent, or Firm—Merchant, Gould, Smith, Edell, Welter & Schmidt

[57] ABSTRACT

A computer-assisted software engineering system facilitates the design, implementation, and execution of applications in cooperative processing environments. Design tools create, store, retrieve, and edit system specifications in a repository. Construction tools generate applications from the systems specification created by the design tools. A run-time execution architecture is provided for executing the applications on a plurality of computer hardware platforms. The run-time execution architecture includes pre-programmed presentation services for interacting with the user and pre-programmed distribution services for routing and transferring messages.

15 Claims, 22 Drawing Sheets

| CUST NUM<br>NUMERIC (4) | CUST NAME<br>ALPHA (32) | 702 |
|---|---|---|
| 1<br>2<br>3<br>4<br>5 | 1<br>2<br>3<br>4<br>5 | |

FIG. 7

| | |
|---|---|
| APPLICATION WESMAP | ⎯902 |
| MASTER WESMAP | ⎯904 |
| WES CONTROL TABLE | ⎯906 |
| COMMAND TABLE | ⎯908 |
| WIDGET DISPATCH TABLE | ⎯910 |
| WINDOW DISPATCH TABLE | ⎯912 |
| WINDOW CONTEXT DATA | ⎯914 |
| STRING – CONSTANTS POINTER | ⎯916 |
| BUSINESS FUNCTION CONTEXT DATA | ⎯918 |
| EXECUTION ARCHITECTURE INFO AREA POINTER | ⎯920 |
| ERROR HANDLER PARAMETER BLOCK POINTER | ⎯922 |

FIG. 9

| | |
|---|---|
| WINDOW ID | ⌐ 1002 |
| INSTANCE ID | ⌐ 1004 |
| NUMBER OF WIDGETS | ⌐ 1006 |
| NUMBER OF FIELDS | ⌐ 1008 |
| SIZE OF WESMAP | ⌐ 1010 |
| CURRENT FIELD | ⌐ 1012 |
| MOUSE POINTER CURSOR | ⌐ 1014 |
| MODALITY | ⌐ 1016 |
| LANGUAGE TYPE | ⌐ 1018 |
| WINDOW HELP LINK | ⌐ 1020 |
| ARRAY OF WIDGET DEFINITION STRUCTURES (STRUCTURE CONTENTS DEFINED BELOW) | ⌐ 1022 |

| | |
|---|---|
| WIDGET TYPE | ⌐ 1024 |
| WESMAP OFFSET | ⌐ 1026 |
| WESMAP LENGTH | ⌐ 1028 |
| WESMAP DATA TYPE | ⌐ 1030 |
| OFFSET OF FIELD CONTROL DATA IN WESMAP | ⌐ 1032 |
| HELP LINK | ⌐ 1034 |
| WIDGET SPECIFIC INFORMATION: | ⌐ 1036 |
|     RADIOBUTTON STRUCTURE | ⌐ 1038 |
|     RADIOGROUP STRUCTURE | ⌐ 1040 |
|     LISTBOX STRUCTURE | ⌐ 1042 |
|     LISTBOX COLUMN DEFINITION STRUCTURE | ⌐ 1044 |

FIG. 10B

| NUMBER OF ENTRIES IN TABLE | ⌐1302 |
| --- | --- |
| ARRAY OF WINDOW DISPATCH STRUCTURES (STRUCTURE CONTENTS DEFINED BELOW) | ⌐1304 |

| EVENT ID | ⌐1306 |
| --- | --- |
| CALLBACK FUNCTION POINTER | ⌐1308 |

FIG. 13B

| NUMBER OF WINDOWS | ⌐1402 |
| --- | --- |
| ARRAY OF WINDOW INFO STRUCTURES (STRUCTURE CONTENTS DEFINED BELOW) | ⌐1404 |

| VERSION | ⌐1406 |
| --- | --- |
| WINDOW ID | ⌐1408 |
| WINDOW CLASS NAME | ⌐1410 |
| WINDOW TYPE | ⌐1412 |
| MODALITY | ⌐1414 |
| CREATE AT STARTUP | ⌐1416 |
| CREATE OPTIONS | ⌐1418 |
| DIALOG RESOURCE ID | ⌐1420 |
| MENU ID | ⌐1422 |
| ICON ID | ⌐1424 |
| WIDGET DISPATCH TABLE | ⌐1426 |
| WINDOW DISPATCH TABLE | ⌐1428 |
| CLASS STYLE | ⌐1430 |
| PM CREATE OPTIONS | ⌐1432 |

FIG. 14B

| | 1502 |
|---|---|
| VERSION | 1502 |
| SOURCE-ADDRESS. | 1504 |
|    SOURCE-SERVICE-ID. | 1506 |
|       SOURCE-SERVICE-NAME | 1508 |
|       SOURCE-SERVICE-VERSION | 1510 |
|       SOURCE-SERVICE-INSTANCE | 1512 |
|    SOURCE-NODE. | 1514 |
|       SOURCE-MAJOR-NODE-NAME. | 1516 |
|          SOURCE-NODE-AREA | 1518 |
|          SOURCE-NODE-NUM | 1520 |
|       SOURCE-MINOR-NODE-NAME | 1522 |
|    SOURCE-PORT | 1524 |
| DEST-ADDRESS. | 1526 |
|    DEST-SERVICE-ID. | 1528 |
|       DEST-SERVICE-NAME | 1530 |
|       DEST-SERVICE-VERSION | 1532 |
|       DEST-SERVICE-INSTANCE | 1534 |
|    DEST-NODE. | 1536 |
|       DEST-MAJOR-NODE-NAME. | 1538 |
|          DEST-NODE-AREA | 1540 |
|          DEST-NODE-NUM | 1542 |
|       DEST-MINOR-NODE-NAME | 1544 |
|    DEST-PORT | 1546 |
| MSG-IDENTIFIER | 1548 |
| ENVIRONMENT | 1550 |
| DATA-LENGTH | 1552 |
| STATUS | 1554 |
| ROUTING-CONTROL | 1556 |
| MSG-TYPE | 1558 |
| PROCESSING-TYPE | 1560 |

| | |
|---|---|
| WINDOW NAME | 1702 |
| WINDOW CLASS NAME | 1704 |
| DEFAULT MODALITY | 1706 |
| CREATE ON STARTUP FLAG | 1708 |
| MENU INDICATOR | 1710 |
| ICON NAME | 1712 |
| TITLE | 1714 |
| DEFAULT ORIGIN | 1716 |
| SIZE | 1718 |
| PM STYLE BITS | 1720 |
| FRAME CREATION FLAGS | 1722 |
| INITIAL FOCUS WIDGET ID | 1724 |

| | |
|---|---|
| WINDOW NAME | 1802 |
| SEQUENCE | 1804 |
| MENU TYPE (PULL-DOWN OR MENU ITEM) | 1806 |
| NAME OF PULL-DOWN OR MENU ITEM | 1808 |

| | |
|---|---|
| WINDOW NAME | 1902 |
| WIDGET NAME | 1904 |
| WIDGET ORIGIN | 1906 |
| WIDGET SIZE OVERRIDE | 1908 |
| WIDGET PM STYLE ATTRIBUTES OVERRIDE | 1910 |
| DEFAULT ATTRIBUTE, STATUS, AND STATE | 1912 |
| DEFAULT COLOR AND FONT INFORMATION | 1914 |
| DEFAULT MESSAGE ID | 1916 |
| ON-LINE HELP LINK | 1918 |
| WIDGET SPECIFIC ATTRIBUTES AND OVERRIDES | 1920 |
| C VARIABLE NAME OVERRIDE | 1922 |

FIG. 24

2400

| PUSH-BUTTON NAME | 2402 |
| DEFAULT SIZE | 2404 |
| DEFAULT PM STYLE ATTRIBUTES | 2406 |
| PUSH-BUTTON TEXT | 2408 |
| MNEMONIC CHARACTER | 2410 |
| COMMAND/EVENT ID | 2412 |
| PREEMPTIVE COMMAND FLAG | 2414 |
| DEFAULT COMMAND STATE AND ATTRIBUTE | 2416 |

FIG. 25

2500

| MENU NAME | 2502 |
| DEFAULT PM STYLE ATTRIBUTES | 2504 |
| MENU TEXT | 2506 |
| MNEMONIC CHARACTER | 2508 |
| COMMAND/EVENT ID | 2510 |
| PREEMPTIVE COMMAND FLAG | 2512 |
| DEFAULT COMMAND STATE AND ATTRIBUTE | 2514 |
| ACCELERATOR CHARACTER | 2516 |
| PARENT MENU NAME | 2518 |

FIG. 26

2600

| ICON TYPE | 2602 |
| RESOURCE ID | 2604 |
| FILENAME | 2606 |
| LOADING OPTION | 2608 |

COMPUTER-ASSISTED SOFTWARE ENGINEERING SYSTEM FOR COOPERATIVE PROCESSING ENVIRONMENTS

BACKGROUND OF THE INVENTION

1. Field Of The Invention

This invention relates generally to computer-assisted software engineering (CASE) systems. In particular, it is directed to a CASE system for developing applications for execution in cooperative processing environments.

2. Description Of Related Art

The level of automation used in software development and design is below the level of automation currently used in the mechanical and electrical arts. Most software applications are developed manually, using conventional third-generation languages such as C, COBOL or FORTRAN. Applications developed manually require a great deal of time and effort to design and implement, are very expensive to maintain, and often do not meet the needs of computer system users. An important trend in the industry is the development of CASE tools to automate and support the software application development process. Currently, there is a trend to move CASE tools from mainframe environments to workstations to take advantage of the workstation's lower cost, faster response time, and processing power. In addition, the integration of mainframes, minicomputers and workstations into a seamless distributive computing environment creates the need for CASE tools that support the development of software applications in this environment. Integration of workstations, minicomputers and mainframes is termed a "cooperative processing environment," wherein applications can be distributed among the different hardware platforms to optimize performance, while high-speed communication links facilitate the transfer of messages between applications.

Andersen Consulting, the Assignee of the present invention, has offered the FOUNDATION® CASE system for a number of years. The FOUNDATION® CASE system is comprised of three major modules: the METHOD/1® software system, the DESIGN/1® software system, and the INSTALL/1® software system.

The METHOD/1 software system optimizes systems development through an automated methodology and project management system. METHOD/1® helps a systems user prepare a management plan or blueprint of future activities that can be modified as priorities change. The systems designer can plan, schedule and scope projects accurately prior to moving to the design phase.

The DESIGN/1® software system automates systems design task techniques to facilitate improved productivity and enhance design quality. The DESIGN/1® software system includes systems for data and process modeling, functional decomposition and prototyping. The DESIGN/1® software system automates and integrates these techniques through the use of a plurality of software tools, including word processing, modeling, screen and report designing, data design and prototyping tools. These tools are integrated through a shared repository, thus providing the ability to share design specifications among designers. Further information on the DESIGN/1® software system can be found in the Andersen Consulting brochure entitled FOUNDATION®-DESIGN/1®, General Description, Version 4.1, 1988, which brochure is hereby incorporated by reference.

The INSTALL/1® software system provides a set of software facilities that allows software designers to create and support application systems. Prior art INSTALL/1® software systems were mainframe-based and designed especially for DB2 development environments. The INSTALL,/1® software system addresses all areas of application generation, including screen and conversation design, code generation, test data management, production systems report, database administration and technical support. The INSTALL/1® software system uses the repository built by the DESIGN/1® software system, thus providing a centralized location for all design specifications. The INSTALL/1® software system simplifies coding by generating all of the programming required for basic application components. Automated code generation improves programmer productivity and helps ensure standardized software. Further information on the INSTALL/1® software system can be found in the Andersen Consulting brochure entitled FOUNDATION®-INSTALL/1®, General Description, Version 1.2, 1989, which brochure is hereby incorporated by reference.

SUMMARY OF THE INVENTION

The present invention comprises a computer-assisted software engineering (CASE) system for facilitating the design, implementation, and execution of applications in cooperative processing environments. Design tools are provided for creating, storing, retrieving, and editing system specifications in a repository. Construction tools are provided for generating applications from the systems specification created by the design tools. A run-time execution architecture is provided for executing the applications on a plurality of computer hardware platforms. The run-time execution architecture is comprised of pre-programmed presentation services for managing the user-interface functions for the application, pre-programmed distribution services for routing and transferring messages, and user-programmed application services for implementing user-defined functions.

DESCRIPTION OF THE DRAWINGS

FIG. 7 is an example of a simple listbox window in the preferred embodiment;

FIG. 9 is a block diagram describing the preferred structure of the window instance structure;

FIGS. 10A, 10B, and 10C are block diagrams describing the preferred structure of the WES control table;

FIGS. 13A and 13B are a block diagram describing the preferred structure of the window dispatch table;

FIGS. 14A and 14B are a block diagram describing the preferred structure of the window definition table;

FIG. 15 is a block diagram describing the preferred structure of the message header;

FIG. 17 is a block diagram describing the preferred structure of the window definition;

FIG. 18 is a block diagram describing the preferred structure of the window-menu relationship;

FIG. 19 is a block diagram describing the preferred structure of the window-widget relationship;

FIG. 24 is a block diagram describing the preferred structure of the push button definition;

FIG. 25 is a block diagram describing the preferred structure of the menu definition;

FIG. 26 is a block diagram describing the preferred structure of the icon definition;

DETAILED DESCRIPTION OF THE PREFERRED EMBODIMENT

In the following detailed description of the preferred embodiment of the present invention, reference is made to the drawings which form a part hereof and which show by way of illustration a specific embodiment in which the invention may be practiced. It is to be understood that other embodiments may be utilized and structural changes may be made without departing from the scope of the present invention.

General Description

The preferred embodiment of the present invention described herein is a computer-assisted software engineering system that facilitates the design, implementation, and execution of cooperative processing applications. The preferred embodiment provides design tools for creating, storing, retrieving, and editing system specifications in an electronic data format. The preferred embodiment also provides construction tools for taking the systems specification created by the design tools and generating an application for execution by a run-time execution architecture. The run-time execution architecture is an environment for executing applications on a plurality of computer hardware platforms. The run-time execution architecture provides pre-programmed presentation services for interacting with the user and pre-programmed distribution services for routing and transferring messages among applications.

Cooperative Processing Environment

A. Overview

Figure 1:
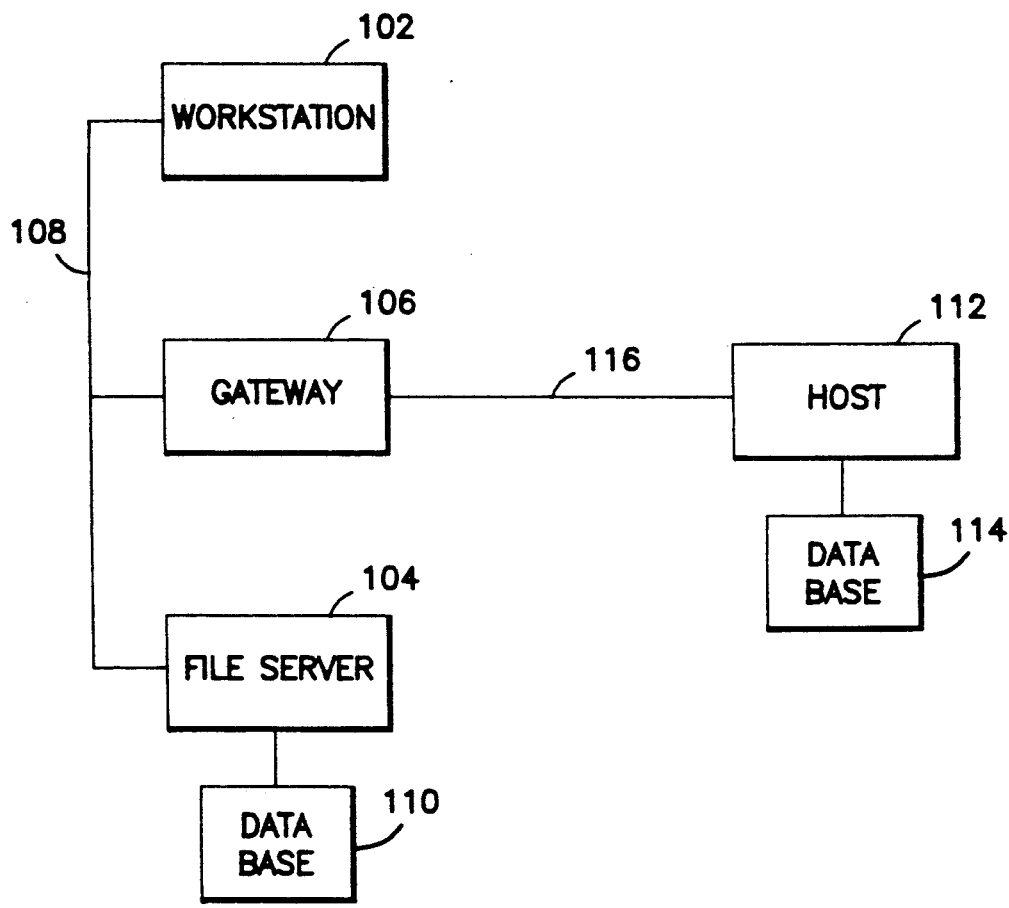
FIG. 1 illustrates a cooperative processing environment.

FIG. 1 illustrates one example of a cooperative processing environment, including workstations 102 for interacting with users, servers 104, and gateways 106. The servers 104 and gateways 106 ar typically connected to the workstations 102 via a local area network (LAN) 108. The servers 104 manage a database 110 of information. The gateways 106 provide for communication 116 between the workstations 102 and remote systems, for example, host computer 112. Alternatively, the workstations 102 could be directly connected to the host computer 112. The host computer 112 also manages a database 114 of information. Those skilled in the art will readily recognize that any combination of workstations 102, servers 104, gateways 106, host computers 112, and communication links 116 could be substituted for the configuration shown.

Run-Time Execution Architecture

Figure 2:
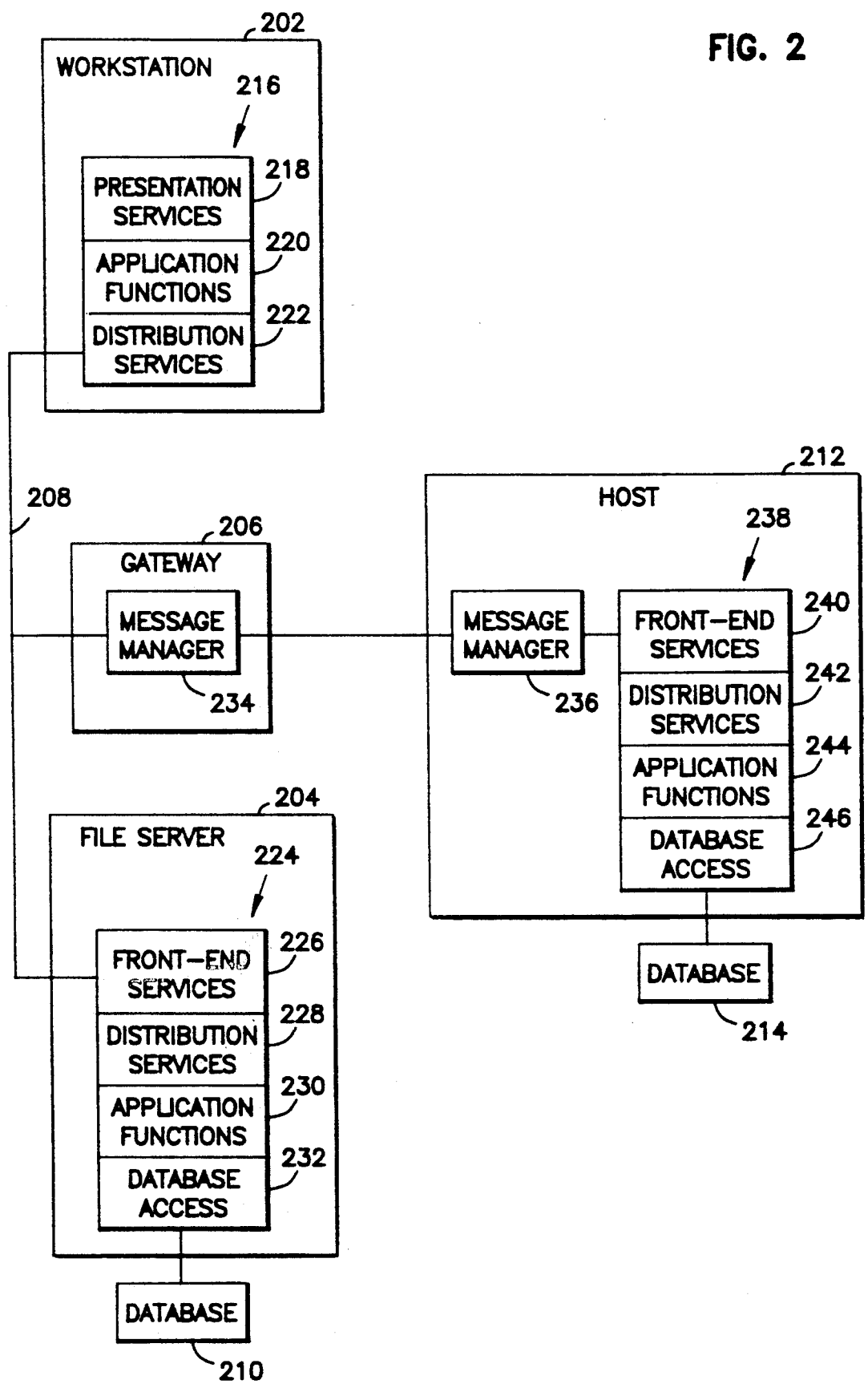
FIG. 2 illustrates a run-time execution architecture for executing applications on a plurality of computer hardware platforms.

The preferred embodiment includes a run-time execution architecture for executing applications on a plurality of computer hardware platforms. FIG. 2 describes the preferred components of the run-time execution architecture services for user applications. The pre-programmed services of the run-time execution architecture insulate the user applications from the detailed implementation of the presentation services for managing the user interface and the distribution services for managing message traffic.

A client application 216 executing on a workstation 202 is typically comprised of pre-programmed presentation services 218, application functions 220, and pre-programmed distribution services 222. In the preferred embodiment, only the design of the user-interface and the application functions 220 are user-specified.

A server application 224 executing on the server 204 is typically comprised of a pre-programmed server front-end 226, pre-programmed distribution services 228, application functions 230, and pre-programmed database access services 232. In the preferred embodiment, only the design of the database 210 and the application functions 230 are user-specified.

A server application 238 executing on the host computer 212 is typically comprised of a pre-programmed server front-end 240, pre-programmed distribution services 242, application functions 244, and pre-programmed database access services 246. In the preferred embodiment, only the design of the database 214 and the application functions 244 are user-specified.

It should be noted that the separate components of the server applications 224 and 238 on the two platforms 204 and 212 are functionally similar. Those skilled in the art will recognize that similar embodiments can be provided on any platform.

A message manager 234 executing on the gateway 206 and a message manager 236 executing on the host computer 212 are preferably pre-programmed modules. The message managers 234 and 236 automatically route and transfer messages from an application on a first platform, for example, client application 216, to an application on a second platform, for example, server application 238. In the preferred embodiment, only the configuration of processes in the cooperative processing environment is supplied by the user to the message managers 234 and 236.

Figure 3:
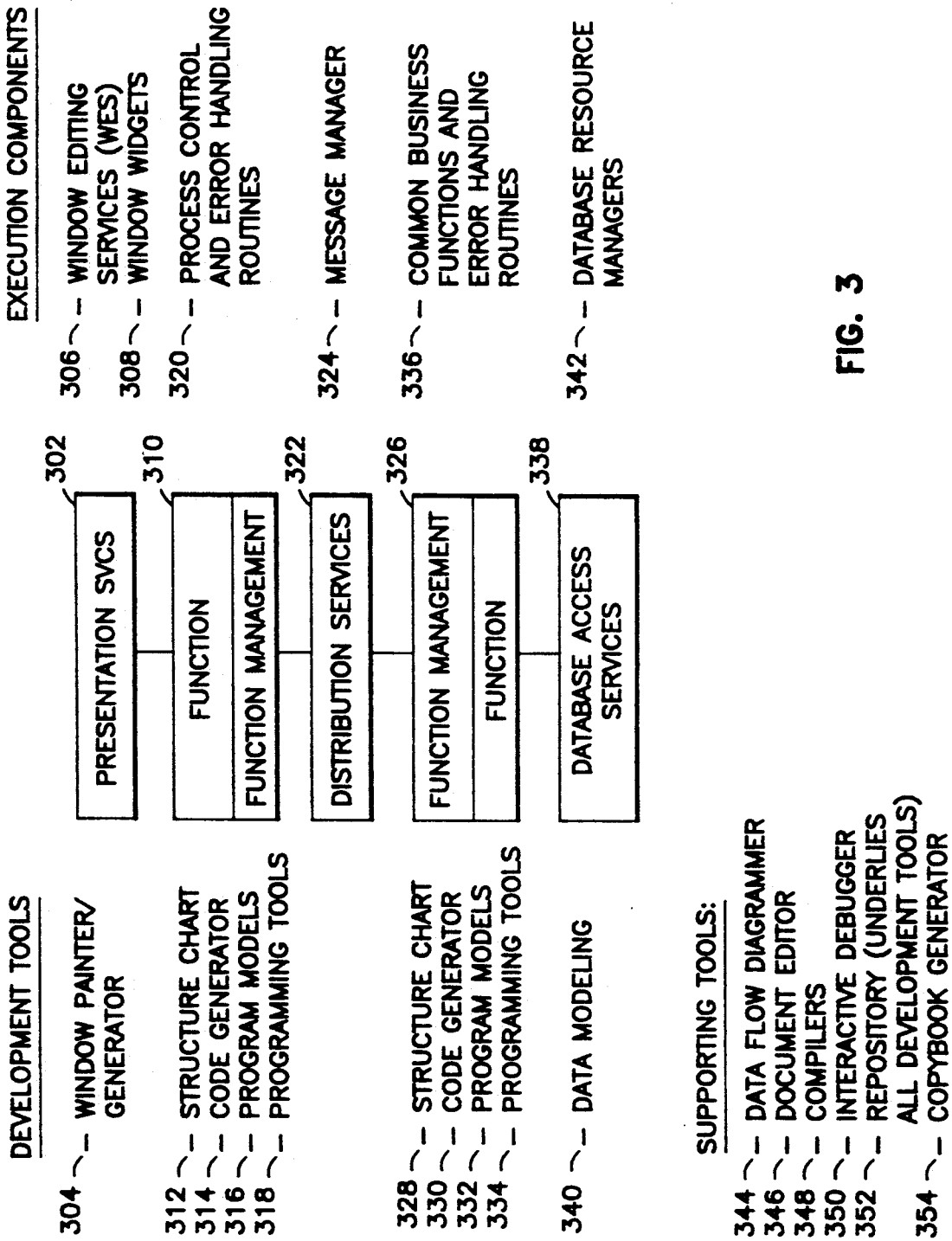
FIG. 3 illustrates a preferred relationship of the different parts of the run-time execution architecture and the tools used to develop application components that use these different parts.

FIG. 3 generally illustrates the preferred relationship of the different parts of the run-time execution architecture.

Windows and other display items are created by using a Window Painter/Generator 304 to define and generate the user interface. The pre-programmed presentation services 302 are comprised typically of Window Editing Services 306 and Window Widgets 308 that manage the windows and display items.

The functions 310 are client-resident functions which are typically specified by the user with the Structure Chart Editor 312 and generated by the user with the Code Generator 314 of the DESIGN/1 ® software system. In addition, the users can write their own code in a standard language such as C, COBOL, etc., using standard programming tools 318, and embed this code in client applications. The functions are comprised typically of process control and error handling routines 320.

In the preferred embodiment, the pre-programmed distribution services 322 are not changed by the user. The user, however, does specify the configuration of hardware and software in the cooperative processing environment. The pre-programmed Message Manager 324 uses this information to determine how to route message traffic.

The functions 326 are server-resident functions which are typically specified by the user with the Structure Chart Editor 328 and Code Generator 330 of the DESIGN/1 ® software system. In addition, the users can write their own code in a standard language such as C, COBOL, etc., using standard programming tools 334, and embed this code in the server applications. The functions 326 are comprised typically of common business functions and error handling routines 336.

The pre-programmed database access services 338 manage databases created by users with a Data Modeler 340 of the DESIGN/1 ® software system. In addition, the users can write their own database access services in a standard language such as C, COBOL, etc., using standard programming tools 334, and embed this code in the server applications. The Data Modeler 340 defines and generates the database access services 338. In addition, the users can write their own version of database access services 338 in a standard language such as C, COBOL, etc., using standard programming tools 334.

In addition to the development tools described above, the user also has a repertoire of supporting tools including a Data Flow Diagrammer 344 from the DESIGN/1 ® software system, document editors 346, compilers 348, debuggers 350, copy member generators 354, etc. The specifications and designs output from all the development tools are stored in a repository database 352.

Pre-Programmed Presentation Services

A. General Description

Figure 4:
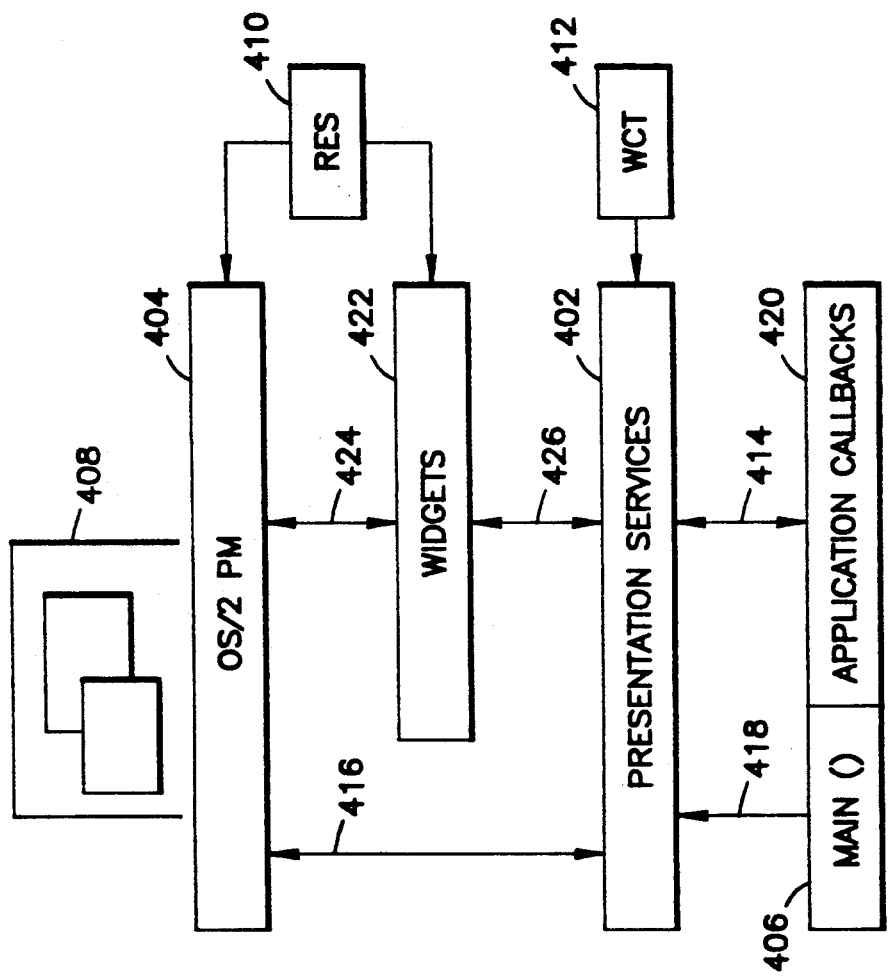
FIG. 4 describes a preferred logical relationship of the presentation services to an operating system and a client application.

FIG. 4 describes the preferred relationship of the pre-programmed presentation services 402 to the operating system 404 and the client application 406. In the preferred embodiment, the presentation services 402 are a pre-programmed collection of services designed to provide a user-interface layer for the run-time execution architecture. The purpose of this layer is to reduce the amount of effort the programmer must put into dealing with the user-interface 408 and allow the programmer to concentrate more on the functions being implemented. Presentation services 402 support a form-filling style of user-interface 408, as well as interfaces 408 that make use of direct object manipulation, graphics, images, and sound.

B. Window Editing Services

In the preferred embodiment, the Window Editing Services (WES) of the presentation services 402 provide a common validation and formatting service so that applications 406 only have to deal with valid data (e.g., a number field is numeric, a date field is valid, etc.), and do not have to write routines to format and verify certain types of data. WES can transfer control to application functions in response to widget and window events 414, for example, such as the user entering a field. These events are defined by the user. Services to enable and disable end-user commands, to reflect the state of data entry or the application 406, are also provided since these are common user-interface features found in applications 406. WES also provides a link to an on-line help manager and provides standard mouse, arrow, and cursor reporting services.

In the preferred embodiment, there are two major features of the presentation services 402: dialogue boxes and widgets. A dialogue box is a type of window used primarily for presenting or gathering information in a form-filling style. Widgets are objects used by dialogue boxes to interact with a user, for example, entry fields, push buttons, check boxes, etc. Widgets are self-contained objects which interact with the user in a predetermined manner and interact with their "owner window," usually the dialogue box, in a predetermined manner, for example, notifying the owner window of changes to the contents of a window, notifying the owner window of field exits, etc.

In the preferred embodiment, widgets and dialogue boxes are the primary interaction mechanisms in the presentation services 402. There may be a plurality of "callback" functions 420 in the application 406. These callback functions 420 are invoked for certain events 414 as specified by the user or the architecture. At the widget level, for example, when the contents of the widget are valid and the event occurs, a callback function 420 is invoked. At the window level, for example, when all required fields are entered, and all widget contents are valid, a different callback function 420 is invoked. There are also callback functions 420 for transitions to invalid states, i.e., when a widget no longer contains valid data or when a required field is blank and when a directly manipulable object is moved to a defined position, etc. This allows the application 406 to clear the fields, disable functions, and notify the parent window of any change. For example, an application 406 may want to disable a "place an order" function when the contents of the order window are invalid.

In the preferred embodiment, there are two types of events that invoke callback functions 420 in applications 406: widget and window level events 414. Widget level events include field entry and exit, depressing or clicking of buttons, the selection of an item in a list box, the alteration of the contents of an entry field, the change in a field's status from valid to invalid, etc. Window level events include interfield validation requests wherein all widgets are invalid when a "major state" change has occurred, for example, a field exit with new data. Window level events can also occur when the window enters an invalid state, when a window is initialized, when a window is closed, or when the user requests a command. Window level events also occur when the application registers 418 an interest in an object with the Shared Data Manager (discussed below) and a message is received from the Shared Data Manager. Window level events also occur when a message is received from the Message Manager (discussed below), whether unsolicited or as the result of an asynchronous message sent earlier to some server or other client.

C. Programming Model

Figure 5:
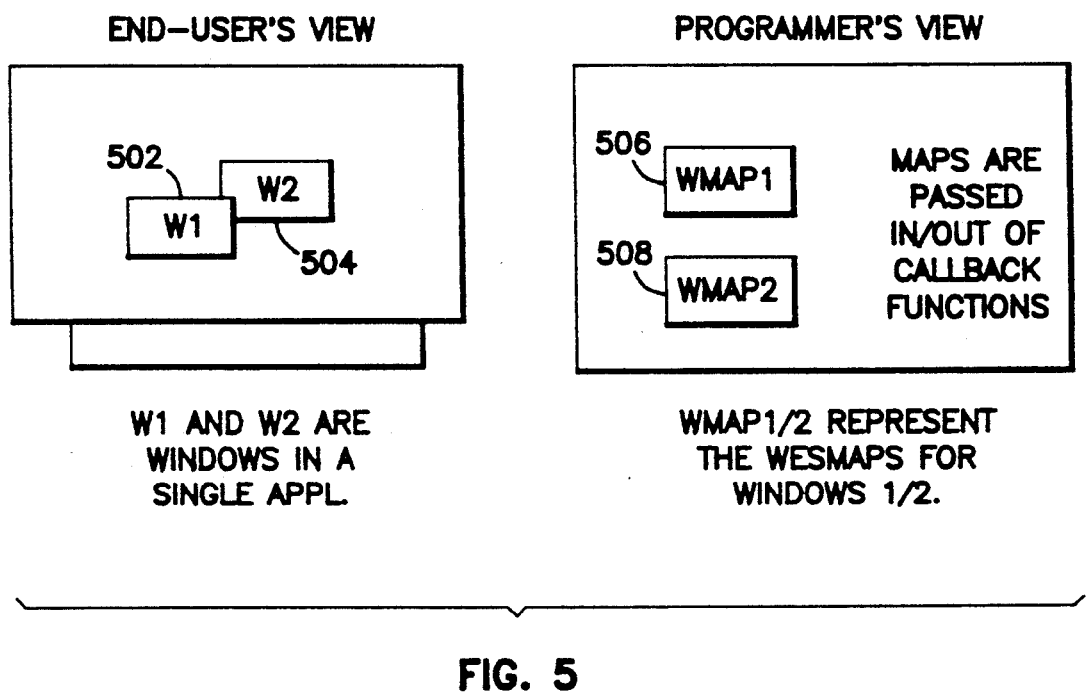
FIG. 5 illustrates a preferred use of a memory mode in the Window Editing Services.

Rather than provide a number of calls for interacting with the various widgets in a dialogue box, the presentation services of the preferred embodiment provide the application with a memory model that represents the contents of the screen. FIG. 5 illustrates a preferred use of this memory model. For each window 502 and 504 on the screen, WES provides a portion of memory 506 and 508, called WESMaps. WES fills the WESMap with the current data values, attributes, etc., for the widgets before calling an application callback function. The application can change values, attributes, etc., directly in the WESMap with simple assignment statements. When the application returns the WESMap to WES, WES checks the changes in the WESMap and updates the widgets accordingly.

In the preferred embodiment, there is only one copy of each WESMap per window to prevent integrity problems due to concurrent updates caused by multiple threads. Thus, all other threads in a process are suspended when one thread requests the WESMap. The other threads are released when the WESMap is released. Those skilled in the art will recognize that alternative embodiments could use semaphores or other means to prevent concurrent updates to the WESMap.

D. WESMap

The preferred structure of the WESMap comprises a window header, a group status, data values, and field control areas. The window header contains window-level information that an application may manipulate, for example, the title of the window, the window size, etc. The group status is an area intended as a status field for field groups defined within the window. This allows user commands to be tied dependently to a field group status so that when the field group is valid the command is enabled. Field values are the data items on the screen. The field control area is a control structure for each field in the window. This structure allows user applications to control the field display attributes, status, access rights, message id, field cursor, and other attributes which may be unique to a particular widget type. The display attributes are concerned with visual attributes. However, a value of −1 in this field indicates that the application is dealing directly with the widget and that WES should no do anything with it. The field status is set every time the field data changes, and thus can be used as a change indicator. It also ensures that valid data is entered into the field. The field access rights determine whether a field is enabled, disabled, hidden, etc. The field message id is the identifier of the message displayed in the message area when the user is in this field, for example, a brief explanation of the field, a warning message, etc. The field cursor is used by WES to indicate which field the cursor was in when the callback function was invoked, even though the field id is also passed as a parameter to the callback function. In addition, the application may use this structure to identify and set the current field. If more than one field has this structure set, then the first one is made the current field.

Since the WESMap represents a window, no application programmer interface (API) calls are required in the preferred embodiment to retrieve or set the contents of a window. A callback function simply sets the various fields in the WESMap to whatever values it needs and WES will handle the display events.

In the preferred embodiment, the WESMAP is represented by a copy member or include file, which those skilled in the art will recognize as a good technique for multiple functions or programs to use the same data structure. The copy member generator tool of the DESIGN/1 ® software system generates the WESMap for each window.

E. User Commands

Referring again to FIG. 4, user commands are preferably not tied to a particular type of widget, for example, push buttons, pull-down menus, etc. The presentation services 402 allow an abstraction to be made so that the application 406 does not have to worry about the presentation format. Thus, the preferred embodiment provides for a separation of the presentation from the meaning of the command. The application 406 need not know what type of widget it is working with, instead, an application 406 simply refers to a command for a window and the presentation services 402 take care of the details. If a command needs to move from a menu to a button or vice versa, the application 406 does not have to be modified; only a WES control table 412 and a resource file 410 need to be updated. Similarly, as new widgets are developed, applications 406 can take advantage of them without changes to the application 406 itself.

There are some presentation services 402 functions used in dealing with user commands, including Hide, Show, Disable, Enable, and Attribute. The Hide function is used if an application 406 does not want a user to know an option exists, for example, if the user security level is not appropriate. The Show command is used where the command becomes available for some reason. The Disable command continues to show the command on the screen but makes it unavailable for use. In most graphical user interfaces, this means that the push button or menu item corresponding to the command would be "greyed" to indicate that under the proper conditions, for example, all fields containing valid input, this command would be available. The Enable function is used to indicate to the user that the command is available. The Attribute function is used for attributes like active/inactive status, for example, when a check mark is used next to an active menu item.

F. Widget Memory Model

Below are listed various widget types, and some of their internal formats, preferably supported in the WESMap:

Entry field
    String of characters of field size
Numeric field
    Signed integer
    Unsigned integer
    Signed double word integer
    Unsigned double word integer
    Single precision float
    Double precision float Date field
  Julian date
  Integer date
Checkbox
  Character field ('N'=unchecked; 'Y'=checked)
  Byte field (0=unchecked/no; 1=checked/yes)
Radio button group
  Character string (radio buttons correspond to different values)
  Integer field (radio buttons correspond to different values)
Listbox
  Maps to a repeating group of entry field references. The first entry in group is always a one byte 'selected' flag
  Subsequent entries represent the columns of each row. Each column can be any data type supported by WES i.e., text, numeric, date, decode, etc.).
  The number of occurrences in a 'master list' is specified in the WES Control Table (WCT). This is not necessarily the number of occurrences visible in the listbox (e.g., 5 visible entries, but a master list of 50 entries).
  WES provides the scrolling features through master list.
  The application is notified via a callback if the user attempts to scroll above the top of list or beyond the end of list. This allows the application to refill the master list (i.e., to page up or down).

G. Example Window and WESMap

Figure 6:
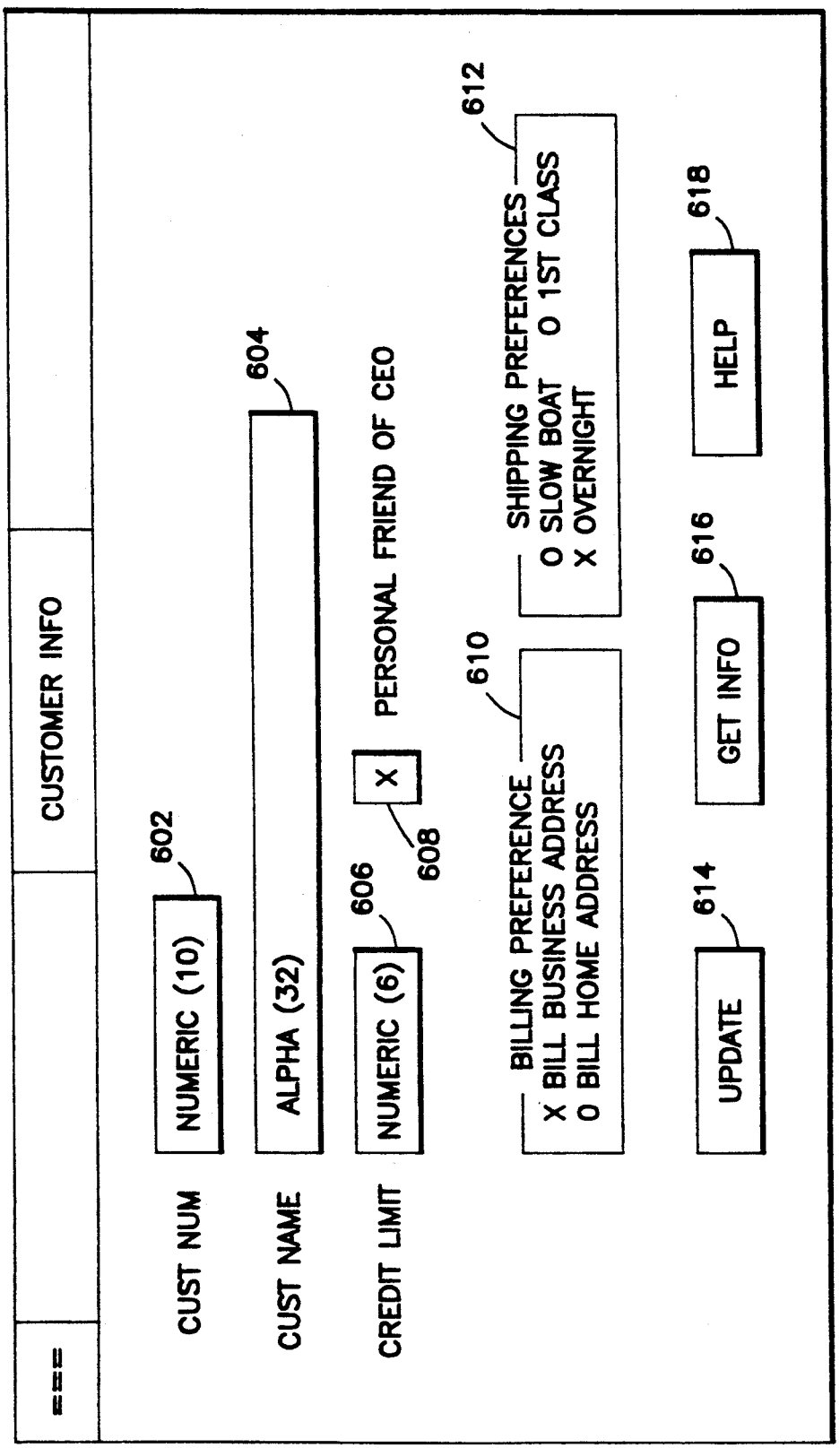
FIG. 6 is a simple example of a window in the preferred embodiment.

FIG. 6 is a simple example of a window. In the preferred embodiment an application's view of this window is a WESMap data area structured as follows:
WESMAPHEADER CustInfo;
byte WindowGroupStatus;
long CustNumData;
char CustNameData[33];
float CreditLimitData; byte FriendOfCEOData;
short BillingPrefData;
char ShippingPrefData[5];
WESFLDCTL CustNumCtl;
WESFLDCTL CustNameCtl;
WESFLDCTL CreditLimitCtl;
WESFLDCTL FriendOfCEOCtl;
WESFLDCTL BillingPrefCtl;
WESFLDCTL ShippingPrefCtl;

The WESMAPHEADER structure contains the global fields WindowTitle, WindowSize, etc. The WindowGroupStatus field is a status field for the window-level group. The CustNumData field 602 assumes the data type for the field is a two word integer. The CustNameData field 604 has 32 bytes for an alphanumeric character string, plus an extra byte to null terminate the string (corresponding to the standard null terminated string in the C language; if generated in another language, for example COBOL, the null terminator would not be generated). The CreditLimitData field 606 assumes the data type for the field is a floating point value. The FriendOfCEOData checkbox 608 only needs a single byte to represent checked/unchecked. The BillingPrefData field 610 uses an integer to represent the various values corresponding to the radio buttons. The ShippingPrefData field 612 has 5 bytes for representing the length 4 character strings each radio button represents.

The WESFLDCTL structure contains control vectors for each field above. The members of the standard WESFLDCTL structure are: "Attr" —logical field attribute; "Status" —field status; "Rights" —field rights; "Msg" —message ID for this field; "Cursor" —cursor control. Some examples of the values for the various field control vectors include:
Attr—AT_NORMAL (e.g., use default display attributes for the field), AT_SELECTED (e.g., highlighted), AT_ATTENTION (e.g., red), AT_NONDISPLAY (e.g., hide field contents).
Status—STS_WESVALID (e.g., valid WES data), STS_VALID (e.g., valid data), STS_INCOMPLETE (e.g., incomplete), STS_INDETERMINATE (e.g., status indeterminate due to asynchronous validation), STS_INVALID (e.g., field invalid).
Rights—RGT_DISABLED (e.g., field disabled), RGT_PROTECTED (e.g., protected mode), RGT_STANDARD (e.g., standard modes).
Cursor—CUR_CURRENT (e.g., current position), CUR_MAKECURRENT (e.g., set cursor position).

The structure of the WCT and the packaging of the pre-programmed services makes it possible to support additional control vectors in the field control structure that may be unique to a particular type of widget.

H. Affecting the Contents of a Window

Since the WESMap represents a window in the preferred embodiment, no procedure calls are required to retrieve or set the contents of a window. A callback function in the application simply sets the various fields to whatever values desired, and WES provides the formatting and displaying functions. In FIG. 6, callback functions would be invoked for "field exits" or when the push-buttons 614, 616, and 618 are clicked. The programmer could insert any programming desired at these callback functions.

For example, in FIG. 6, assume a programmer decided that customer numbers greater than 1000 should only be billed at home. The following code in the "field exit" callback for the CustNumData field 602 would do the following:

if (CustNumData>1000)
BillingPrefData=LT_BILLINGPREF_HOME;

Additional examples of code for accessing the members of the field-control structure are provided below:
CustNumAttr=AT_ATTENTION;
ShippingPrefRights=RGT_DISABLED;
CustNameMsg=MSG_HIMOM;
FriendOfCEOCursor=CUR_MAKECURRENT;

The complete field-control structure can be referenced (i.e., for passing to a function) by using the field name without any qualifier (i.e., data, attr). An example of passing the customer number field to a validation routine is:

ValidateCustNum (CustNumData, &CustNumCtl);

I. Example ListBox Window and WESMap

FIG. 7 is an example of a simple listbox window. The window 702 has 5 rows visible at any one time. An application, however, may have, for example, 50 rows defined in its "master list." The Listbox name is "CustList" (which is used for field control declarations). The memory model WESMap would present to the application is:
WESMAPHEADER CustList;
byte CustListSeData[50];
int CustNumData[50];
char CustNameData[33][50];
WESFLDCTL CustListSelCtl[50];
WESFLDCTL CustNumCtl[50];
WESFLDCTL CustNameCtl[50];

The CustListData structure is a selection indicator comprising 50 occurrences of the CustListSelData field containing a selection indicator, the CustNumData field containing the customer number, and the CustNameData field containing each row of a customer name, wherein each row comprises 32 characters. The CustListCtl structure is the control vector for the complete listbox. The CustListRowFldCtl structure is the control vector for the rows of the listbox. The CustListSelCtl field is the control vector for selection of a particular row. The CustNumCtl field is the control vector for each entry in the "CustNum" column. The CustNameCtl structure is the control vector for each entry in the "CustName" column.

J. Presentation Services Data Structures

Figure 8A:
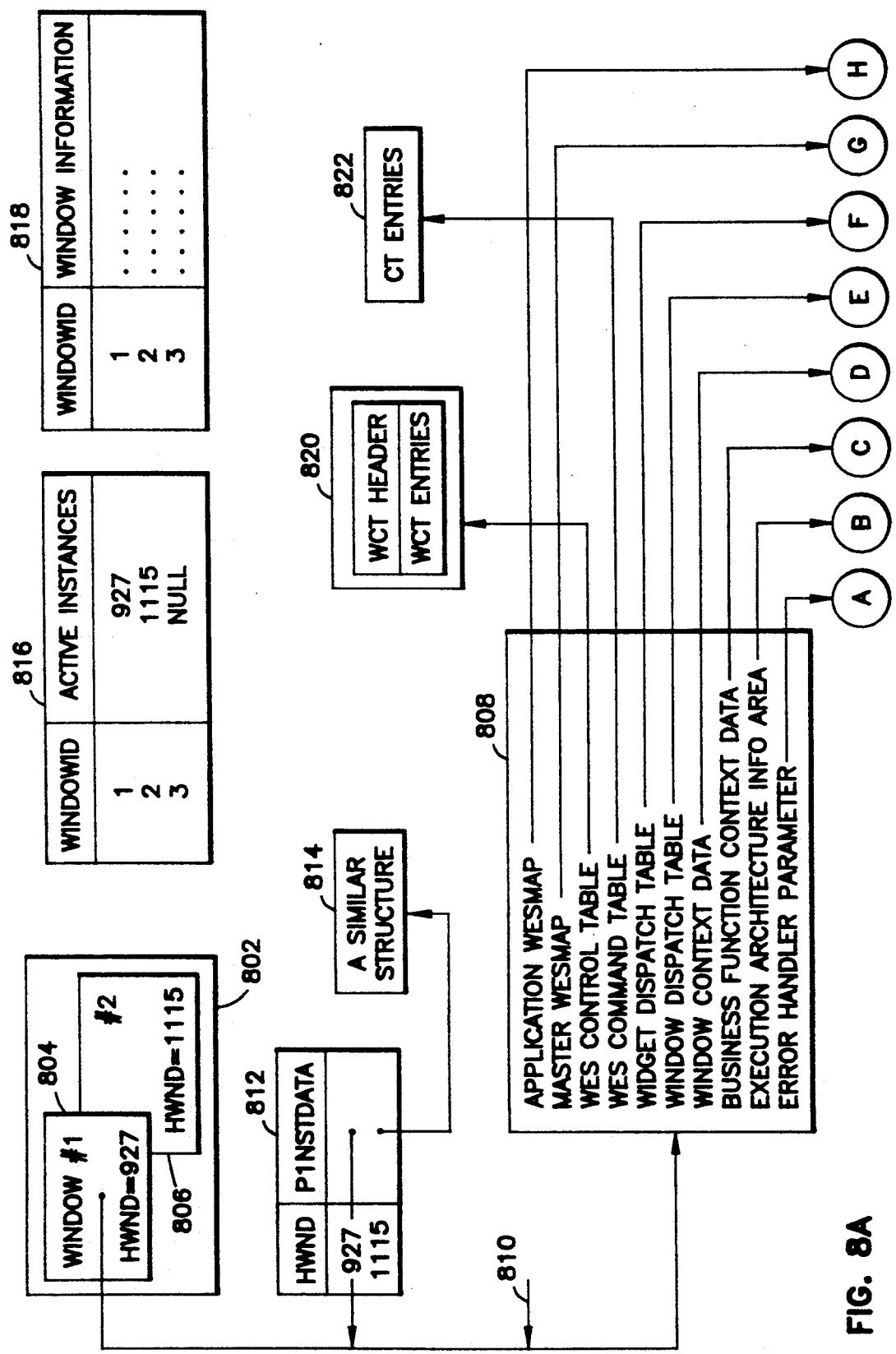
FIGS. 8A and 8B describe the data structures used by the preferred presentation services.
Figure 8B:
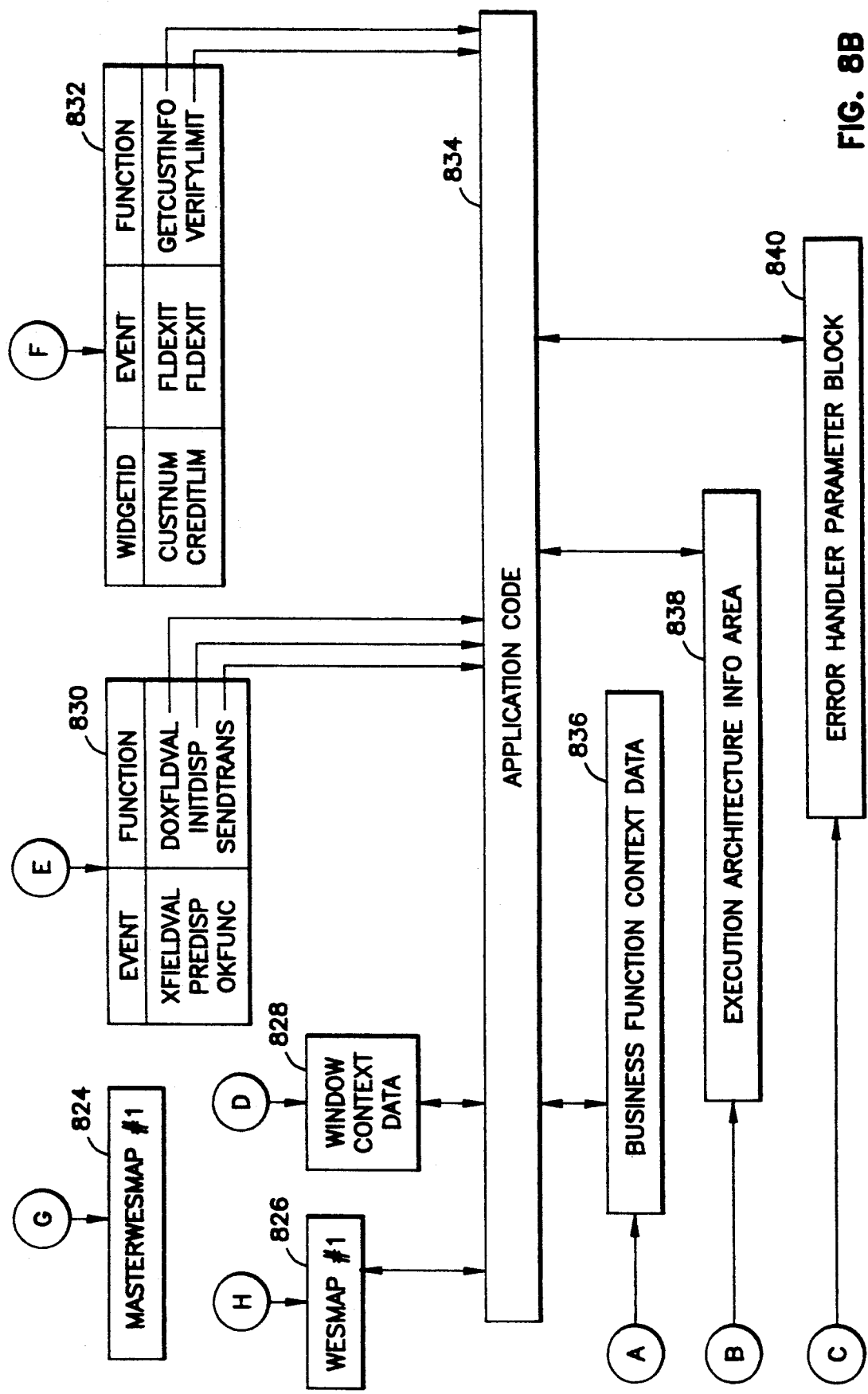

FIGS. 8A and 8B describe the data structures used by the presentation services in the preferred embodiment. A list of all defined windows available to the system is maintained in a Window Definition Table 818. Each window 804 and 806 is identified on a screen 802 by a window handle, "927" and "1115" respectively. A list of all active windows and an "instance" number associated therewith is maintained in an Active Instance Table 816. A list of window handles and the associated pointers 810 and 814 to the specific "instance data" associated with a window is maintained in an Instance Table 812. In FIG. 8A, a data pointer 810 is shown, which pointer is associated with window 804 whose handle is "927". The data pointer 810 points at the Window Instance Structure 808. The Window Instance Structure 808 is the structure WES creates and associates with a window. This structure contains all the data required by WES for handling and dispatching events. The Window Instance Structure 808 is comprised of pointers to an Application WESMap 826, a Master WESMap 824, a WES Control Table 820, a Command Table 822, a Widget Dispatch Table 832, a Window Dispatch Table 830, a Window Context Data area 828, a Business Function Context Data area 836, an Execution Architecture Info area 838, and an Error Handler Parameter Block 840.

A Window Instance Structure 808 is further described in FIG. 9. The Application WESMap 902 is a memory area passed to application program, and includes header information, widget data and widget control attributes. The Master WESMap 904 is a second copy of WESMap used by WES to detect changes made by application. The WES Control Table 906 is a list of widget, widget types and associated data. The Command Table 908 is a list of user commands and associated data. The Widget Dispatch Table 910 is a list of widgets, events and callback routines. The Window Dispatch Table 912 is a list of windows and callback routines. The Window Context Data 914 contains data unique to each instance of a window. The String-Constants Pointer 916 is a pointer to strings used for widget values. The Business Function Context Data 918 contains data shared across all windows of the same Business function. The Execution Architecture Information Area Pointer 920 is a pointer to Execution Architecture specific data. The Error Handler Parameter Block Pointer 922 is a pointer to common error handler interface data.

Figure 10C:
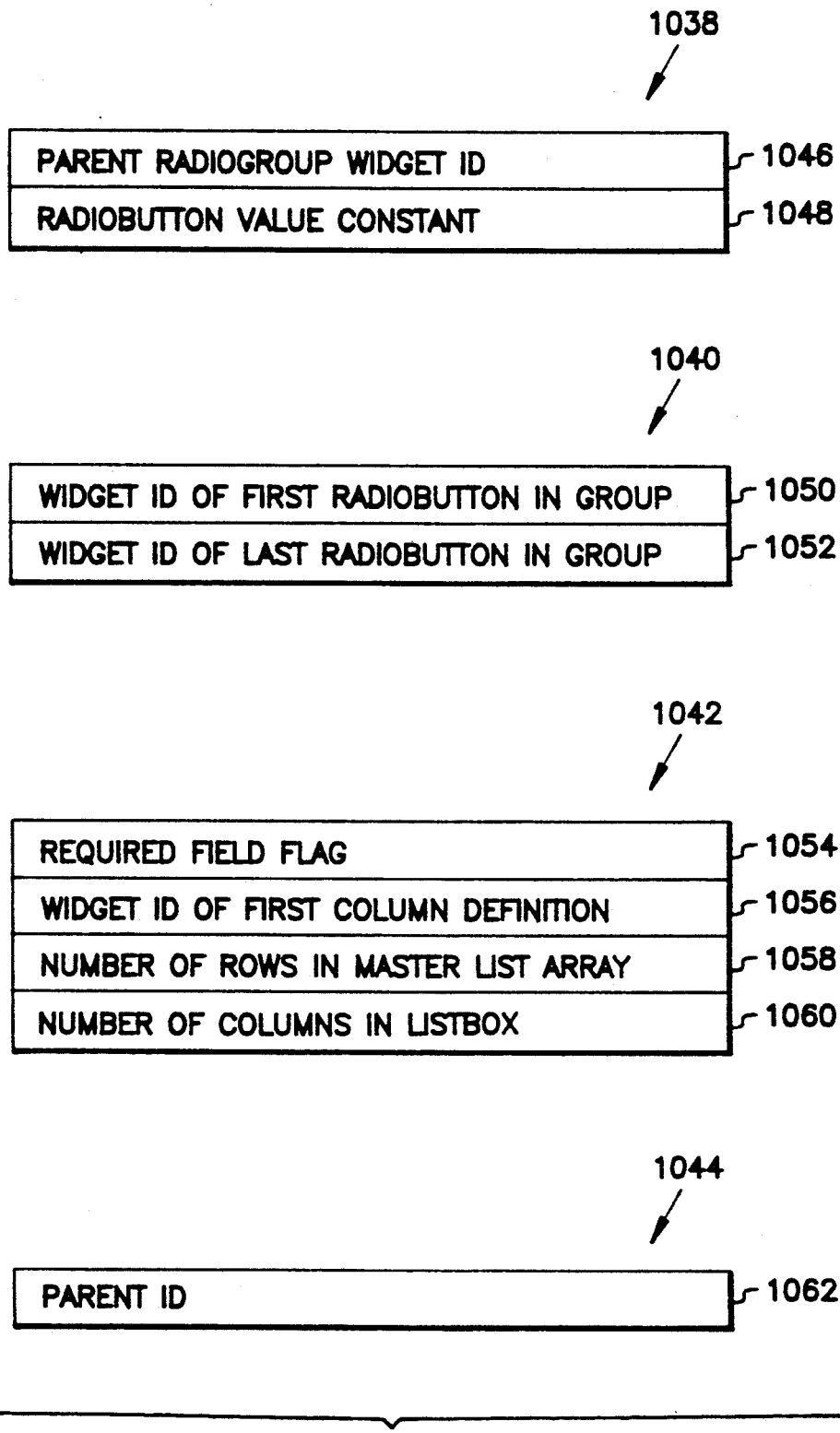

A WES Control Table (WCT) 820 is described in FIGS. 10A, 10B, and 10C, and contains the following fields. The Window ID 1002 identifies the class of the window. The Instance ID 1004 is used to distinguish between multiple instances within a class of window. The Number Of Widgets 1006 is the number of widget definitions associated with the window. The Number Of Fields 1008 is the number of fields in WESMap. The Size Of WESMap 1010 is the size of WESMap in bites. The Current Field 1012 identifies the field where the cursor is position. The Mouse Pointer Cursor 1014 is the shape of pointer when it is positioned in this window. The Modality 1016 is the modality of this window (i.e., application modal, system modal, or modeless). The Language Type 1018 identifies the programming language used to write the application. The Window Help Link 1020 identifies the window-level "help" text. The Array Of Widget Definition Structures 1022 is described in FIG. 10B and contains the following fields. The Widget Type 1024 identifies a type of widget (e.g., text field, date field, radio button, etc.). The WESMap Offset 1026 is the offset for the widget data value. The WESMap Length 1028 is the length of the widget data value. The WESMap Data Type 1030 is the internal format of the widget data value (e.g., floating point, character, etc.). The Offset Of Field Control Data In WESMap 1032 identifies the location of the field control structure. The Help Link 1034 identifies the "help" text for the widget. The structures used for the Widget Specific Information 1036 are described in FIG. 10C and contain the following fields. The Radio Button Structure Definition 1038 contains the following fields. The Parent Radio Group Widget ID 1046 identifies the group of which the button is a member. The Radio Button Value Constant 1048 identifies the value of the radio button. The Radio Group Structure Definition 1038 contains the following fields. The Widget ID Of First Radio Button 1050 identifies the first radio button in the group. The Widget ID Of Last Radio Button 1052 identifies the last radio button in the group. The Listbox Structure Definition 1042 contains the following fields. The Required Field Flag 1054 indicates that a selection must be made. The Widget ID Of First Column 1056 identifies the widget for the first column in the listbox. The Number of Rows In Master List Array 1058 is the predefined size of the memory allocated for the list. The Number Of Columns In Listbox 1060 is the predefined number of columns in the listbox displayed on the screen. The Multiple Selection Flag 1062 indicates whether multiple rows can be selected. The Listbox Column Definition 1044 contains the Parent ID 1064 which identifies the widget that owns the column of the listbox.

Figure 11A:
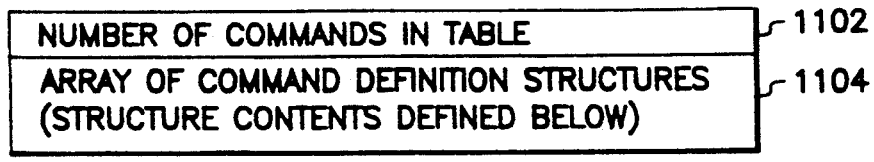
FIGS. 11A, 11B are a block diagram describing the preferred structure of the command table.
Figure 11B:
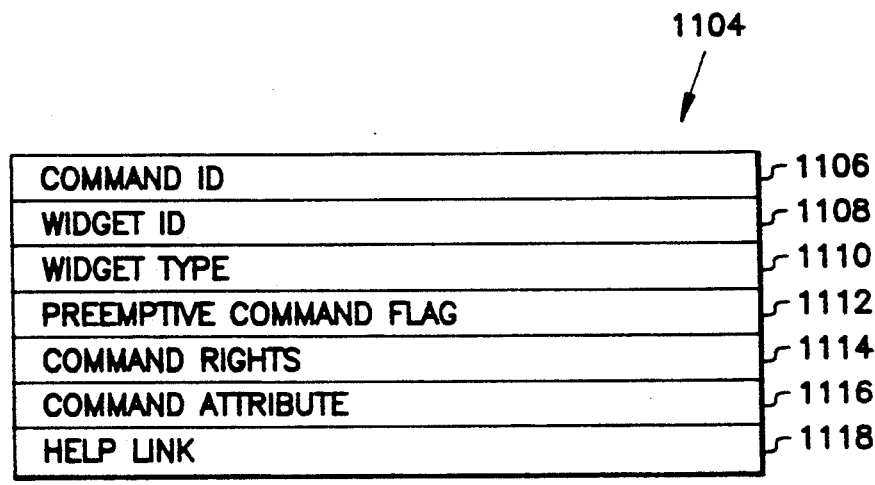

A Command Table 822 is described in FIG. 11, and contains the following fields. The Number of Commands 1002 identifies the number of entries in the table. The Array Of Command Definitions Structures 1004 contains the following fields. The Command ID 1006 uniquely identifies the command. The Widget ID 1008 identifies the widget associated with the command. The Widget Type 1010 identifies the type of widget (e.g., push button, menu item, etc.). The Preemptive Command Flag 1012 indicates whether the command is always enabled or is dependent on the status of the window or group of fields. The Command Rights 1014 are the current rights and availability of command (i.e., enabled, hidden, etc). The Command Attribute 1016 identifies the current command attributes. The Help-Link 1018 identifies the "help" text for the command.

Figure 12A:
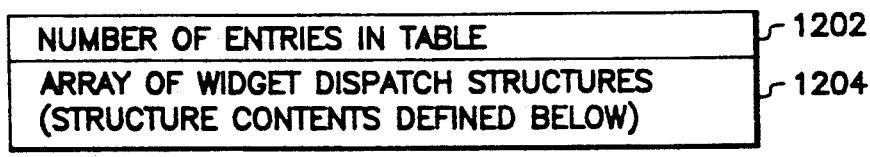
FIGS. 12A and 12B are a block diagram describing the preferred structure of the widget dispatch table.
Figure 12B:
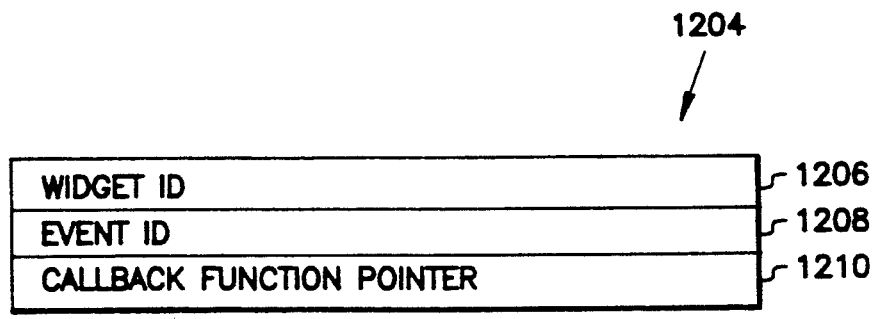

A Widget Dispatch Table 832 is described in FIG. 12, and contains the following fields. The Number of Entries 1202 gives the number of entries in the table. The Widget Dispatch Structure Definition 1204 contains the following fields. The Widget ID 1206 identifies the widget. The Event ID 1208 identifies the event that occurs with the widget (i.e., field exit, field change, etc). The Callback Function Pointer 1210 identifies the function that should be invoked when the event occurs for the widget.

A Window Dispatch Table 830 is described in FIG. 13, and contains the following fields. The Number of Entries In Table 1302 is the number of entries in the dispatch table. The Window Dispatch Structure Definition 1304 contains the following fields. The Event ID 1306 identifies the event that occurs (i.e., pre-display, interfield validation, etc). The Callback Function Pointer 1308 identifies the function that should be invoked when the event occurs for the window.

A Window Definition Table 818 is described in FIG. 14, and contains the following fields. The Number Of Windows 1402 is the number of window types in the client application. The Window Information Structure Definition 1404 contains the following fields. The Version 1406 identifies the version of the data structure. The Window ID 1408 is the Presentation Services window ID. The Window Class Name 1410 is the window class for non-WES windows. The Window Type 1412 may be WES, native Presentation Manager, or some other type. The Default Modality 1414 indicates whether the window is application modal, modeless or system modal. The Create At Startup 1416 is a flag indicating a window should be created when the application first starts. The Create Options 1418 can create a window as an icon, hidden, maximized, etc. The Dialogue Resource ID 1420 identifies the resource to be used to display the window. The Menu ID 1422 is the menu identifier to use for the window. The Icon ID 1424 describes the bit mapped icon graphic to use for the window when shrunk to icon size. The Widget Dispatch Table 1426 is a pointer to the Widget Dispatch Table (see FIG. 12). The Window Dispatch Table 1428 is a pointer to the Window Dispatch Table (see Figure 13). The Class Style 1430 includes the Class Style registration options for native Presentation Manager windows. The PM Create Options 1432 include the Default Frame creation options for native Presentation Manager windows.

Pre-Programmed Distribution Services

A. General Description

Referring again to FIG. 3, the Distribution Services 322 are preferably pre-programmed modules and processes that provide for the automatic routing and transferring of messages based on the function or service being requested. Alternatively, the Distribution Services 322 provide for the automatic routing and transferring of messages based on a direct address. The Distribution Services 322 determine the location of the service, route the request to that location, handle exceptions (such as time-outs, routing errors, transmission errors, and other abnormal conditions), and return an optional reply from the service to the client-requester.

As illustrated in FIG. 2, the Distribution Services modules 222, 228, and 242, and Message Manager processes 234 and 236, reside on all supported hardware platforms 202, 204, 206 and 212. This means that the Distribution Services 322, in the preferred embodiment, reside on all hardware platforms running OS/2 and CICS.

The Distribution Services 322 are functionally divided into four (4) layers: (1) Transmission Services (TS); (2) Message Services (MS) and (3) Guaranteed Delivery (GD). Each of the layers is described in more detail below.

FIG. 15 describes a Message Header 1500 that is used by the Distribution Services 322 when transferring messages. The Message Header precedes 1500 all data transmitted between nodes.

The Message Header 1500 is preferably comprised of the following fields. The VERSION field 1502 indicates which version of the software generated the Message Header 1500, thereby permitting revisions as required. The SOURCE-ADDRESS field 1504 indicates the routing location of the sender of this message. Within the SOURCE-ADDRESS field 1504, the SOURCE-SERVICE-ID field 1506 indicates the service type of the sender, the SOURCE-NODE field 1514 indicates the node that the message came from, and the SOURCE-PORT field 1524 indicates the local source address of the message (i.e., a queue, a unique process identifier, etc). Within the SOURCE-SERVICE-ID field 1506, the SOURCE-SERVICE-NAME field 1510 identifies the name of the sending service, the SOURCE-SERVICE-VERSION field 1510 identifies the version of the service, and the SOURCE-SERVICE-INSTANCE field 1512 identifies a particular instance of the service. Within the SOURCE-NODE field 1514, the SOURCE-MAJOR-NODE-NAME field 1516 and the SOURCE-MINOR-NODE-NAME field 1522 identify the node where the service resides. Within the SOURCE-MAJOR-NODE-NAME field 1516, the SOURCE-NODE-AREA field 1518 identifies the area where the node resides and the SOURCE-NODE-NUM field 1520 identifies the unique node number within the particular area. The DEST-ADDRESS field 1526 indicates the routing location of the receiver of this message. Within the DEST-ADDRESS field 1526, the DEST-SERVICE-ID field 1528 indicates the service type requested, the DEST-NODE field 1536 indicates the node that the message is destined for, and the DEST-PORT field 1546 indicates the local destination address of the message (i.e., a queue, a unique process identifier, etc). Within the DEST-SERVICE-ID field 1528, the DEST-SERVICE-NAME field 1530 identifies the name of the requested service, the DEST-SERVICE-VERSION field 1532 identifies the version of the service, and the DEST-SERVICE-INSTANCE field 1534 identifies a particular instance of the service. Within the DEST-NODE field 1536, the DEST-MAJOR-NODE-NAME field 1538 and the DEST-MINOR-NODE-NAME field 1544 identify the node where the service resides. Within the DEST-MAJOR-NODE-NAME field 1538, the DEST-NODE-AREA field 1540 identifies the area where the node resides and the DEST-NODE-NUM field 1542 identifies the unique node number within the particular area. The MSG-IDENTIFIER field 1548 is a unique identifier for the message being sent, generated by the source-side message services. The ENVIRONMENT field 1550 indicates the operating environment of the message. The DATA-LENGTH field 1552 indicates the length of the data area that follows the Message Header 1500. The STATUS field 1554 is used between two platforms to indicate the internal return code from an operation. The ROUTING-CONTROL field 1556 provides control over the sending and resending of messages between nodes. The MSG-TYPE field 1558 indicates whether this message is a request or a reply. The PROCESSING-TYPE field 1560 indicates whether a reply is requested, no reply is requested, or guaranteed delivery is to be used.

B. Transmission Services

The Transmission Services (TS) layer preferably uses vendor-provided communications access methods, such as LU 6.2 and the OS/2 LAN Manager, to provide network-wide connectivity. The functionality provided by the TS layer preferably includes:

Insulating the Message Services layer from awareness of the underlying communications access method(s).

C. Message Services

The Message Services (MS) layer preferably works with the Transmission Services to implement the client/server model. The functionality provided by the MS layer preferably includes:

Intranode vs. internode routing decisions ('thin layer';

Indirect request routing by the service identifier, i.e., DEST-SERVICE-ID 1528, of the Message Header 1500 in FIG. 15;

Direct request routing by the physical address, i.e., DEST-NODE 1536, of the Message Header 1500 in FIG. 15;

Request/reply matching;

Reply timeout monitoring;

Server attribute management;

Server address services;

Server version verification;

Application data translation; and

Access method independent, network wide node addressing;

Dynamic address assignment;

Permit multiple virtual circuits between pairs of network nodes; and

Message segmentation and reassembly.

MS sends messages from a source node to the peer MS component residing within a destination node. For host-to-host communications, source and destination nodes are adjacent and hence no intermediary MS nodes are involved.

Messages sent between a workstation and a remote host, or between workstations residing on different LANs, pass through one or more intermediary MS components, i.e., Message Managers residing on one or more intermediary nodes.

Because of the intermediary routing function, for each message received MS compares the DEST-ADDRESS 1526 of the Message Header 1500 in FIG. 15 with that of its own node, and if they match, places the message on the client or server application queue. Otherwise, MS routes the message to the destination MS.

Each workstation node obtains their addresses their respective MS Configuration Files. Host nodes obtain their addresses from their respective MS Configuration Files. An alternative embodiment could use a gateway resident MS Address Server to dynamically assign an address to each workstation node during MS connection establishment.

The following paragraphs provide a description of MS functions in the preferred embodiment. Functional differences between host, LAN gateway and workstation implementations are discussed later.

MS will route replies to request messages if so requested, but typically the application is not blocked while the reply is outstanding. Matching of replies to requests allows MS to deliver a reply to the proper requestor and to filter out replies destined for applications that have already been released from their wait for the reply through the operation of a timeout.

Timeout intervals are assigned to each MS request message that expects a reply. If the timeout interval expires before a corresponding reply is received, MS calls the error logging subsystem to log the error and builds a reply message containing a REQUEST-TIMEOUT code in a Status field of a Parameter Block which is returned to the requesting application. If the reply appears subsequent to these actions, an error will be logged and the reply will be discarded.

MS typically determines whether a given service request can be satisfied at the local node (i.e., a local server) or must be shipped to some remote node for servicing (i.e., a remote server). Local server requests bypass TS and are sent directly to the appropriate server.

MS translates the service identifier, i.e., DEST-SERVICE-ID 1528 of the Message Header 1500 in FIG. 15, received from the application to the correct physical address, i.e., DEST-NODE 1536 of the Message Header 1500 in the FIG. 15. All of these fields need not be specified. The address is then mapped to a virtual circuit and the proper TS line handler. For applications needing a direct addressing capability, a DEST-NODE field 1536 of the Message Header 1500 in FIG. 15 can be specified in place of the DEST-SERVICE-ID 1528.

At node initialization time, MS determines the local server configuration and availability. This information is then sent in an MS control message to all other (remote) MS nodes in the network. Each remote MS that receives this message uses it to update the server records in its own Node Availability Table, and replies with information concerning the current availability of its own local servers; this information is used by the originating MS to update its Node Availability Table. After this exchange of control messages, MS initialization is complete. These tables can also be configured statically prior to startup if desired. The MS must also monitor the current availability of all local servers and notify all other MS nodes about status changes within its node.

MS is typically responsible for translating incoming data into the format appropriate for the local hardware. When an application requests that MS send a message, it passes a Translation Control Block to MS, which describes the format of the fields in the message. MS on the sending node and MS and the receiving node work together to translate the message. The Translation Control Block is generated by a tool in the DESIGN/1 ® software system. Examples of format translation include ASCII to EBCDIC and inverted byte binary to non-inverted byte binary.

1. MS Nodes

In the preferred embodiment, MS nodes are characterized as:

Workstation (Workstation MS);

Gateway (Gateway MS); or
Host (Host MS).

The functions implemented within each node type differ somewhat. Host MS functions consist of those general functions described above. Divergence from general functionality for each of the other node types in the preferred embodiment is described below.

Unlike Host MS and Gateway MS, Workstation MS maintains a very limited Routing Table in the preferred embodiment. Following node initialization, a Workstation Routing Table typically contains one entry for each server residing on that node, and one entry for the gateway-resident address server.

When a request arrives for a service not represented in the workstation routing table, Workstation MS generates and sends an address resolution request to the gateway-resident address server. The returned address information updates the Workstation Routing Table and the original request is now sent.

In the preferred embodiment, Gateway MS receives service availability information from:
Workstation MS;
Host MS; and
Gateway-resident services.

Gateway MS exchanges LAN-based service availability information with all Host MS's and Gateway MS's in the network. Rather than propagating Host MS and Workstation MS service availability information to locally attached Workstation MS's, preferably the Gateway MS makes the information available through a gateway-resident address server.

In the preferred embodiment, a service is characterized by a set of service attributes. These attributes are kept and maintained by the Message Services. They are obtained from service descriptor entries residing either in the local MS configuration file (locally resident services), or from service descriptor entries passed from MM to MM via through service resource exchange messages. In the preferred embodiment, attributes may be classified as either permanent or transient.

2. Permanent Attributes
   a. Service Name:
   This is the character string name of an abstract service. It does not identify a specific process.
   b. Instance Opcode and Operand:
   When qualified by a service name, the instance opcode and instance operand identify a specific server process. This process provides the service indicated by server name.
   c. Scope:
   A service may have either local, global, or LAN scope. Services with local scope are known and available only to clients residing on the same node as the service. Thus, MS does not exchange information regarding these services with remote MS nodes. Globally scoped services, by far the more common, are available to clients residing on any node of the network. A LAN scoped service is available only to nodes residing on the same LAN as the service.

3. Transient Attributes
   As their name implies, transient attributes in the preferred embodiment tend to vary 'frequently' over time, some changing more often than others.
   a. Service Version:
   The MS permits a application to specify a DEST-SERVICE-VERSION field 1532 of the Message Header 1500 in FIG. 15. If the application exercises this option, MS will send the message only to a service with a matching version. If no such service exists, an error code will be returned to the application.
   b. Availability:
   Service availability or status is probably the most frequently changing of all attributes. One of MS's main responsibilities is tracking the availability of all locally resident services, and exchanging this information with remote MS nodes.

D. Guaranteed Delivery:
The Guaranteed Delivery service in the preferred embodiment provides guaranteed store-and-forward message delivery between two applications. The guaranteed in 'Guaranteed Delivery' refers to the use of vendor-supplied transaction services to provide:
Protected resources;
Atomic transactions (logical unit of work):
   start transaction;
   commit transaction;
   rollback transaction;
Recovery/restart.

The above vendor-provided services provide, in the preferred embodiment, the functionality and degree of reliability defined for the Guaranteed Delivery service. Thus, once a message has been accepted for delivery, it will eventually be delivered to its destination and it will be delivered exactly once. In most cases, it will be delivered in the order in which it was accepted for delivery.

Server Front End

The Server Front End (SFE) is a pre-programmed service which manages server applications in the preferred embodiment. Its purpose is to make it easier for programmers to build applications and to standardize programming interfaces. An embodiment of the Server Front End exists on all platforms which can run the described run-time execution architecture. The Server Front End is customized on each of these platforms to run properly on that platform. By being so built, it enables application functions to be similar or identical on all platforms, thereby enabling portability of application functions between platforms.

The Server Front End preferably performs the services of:
Receiving messages from the Distribution Services, which were sent by another application. The other application could be on any computer which can communicate with the SFE.
Dispatching the message to the appropriate application function.
Handling errors and abnormal terminations.
Providing access to a database, including connection, open, and/or log on, for the application functions. However, the application functions issue the input and output commands.
Issuing rollback or commit commands to the database.
Coordinating between the application functions and the guaranteed delivery component of Distribution Services.
Upon completion of the application function, routing the reply message (if any) from the application to the sender of the original request message.
Optimizing the performance of the server application by appropriate techniques for the hardware and operating system on which the SFE is running. Examples of these techniques are:

on OS/2, multi-threading; spawning a new thread to process each incoming message on Unix, muiti-tasking; starting a new task to process each incoming message Those skilled in the art will recognize that other techniques may be used on these platforms and that other platforms may have analogous techniques. The Service Front End does not provide all these services on all platforms.

Design Tools

Figure 16A:
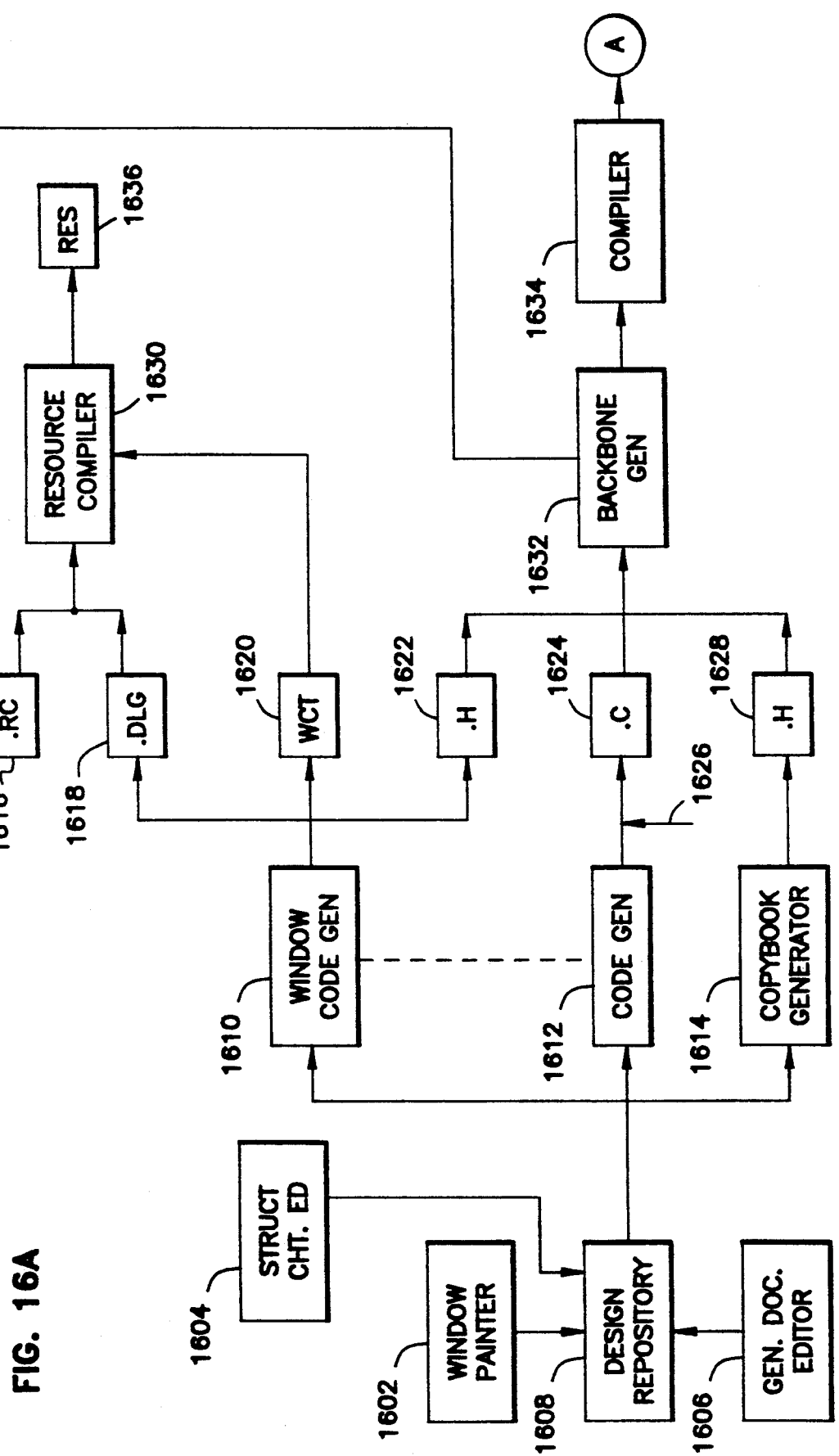
FIGS. 16A and 16B illustrate a preferred relationship between the design tools, the repository, the construction tools, and the user application.
Figure 16B:
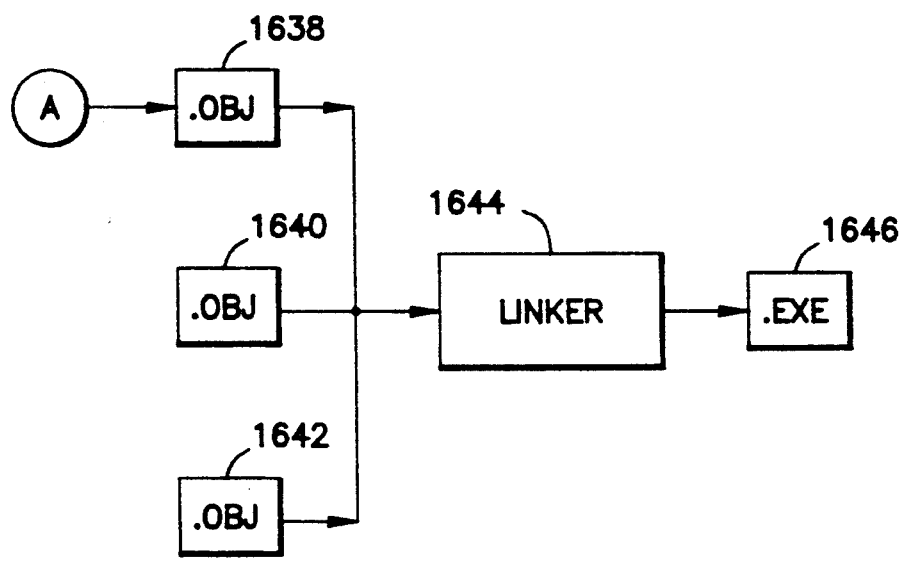

FIGS. 16A and 16B illustrate a preferred relationship between the design tools 1602, 1604, and 1606, the repository 1608, the construction tools 1610, 1612, 1614, 1630, 1632, 1634, and 1644, and the user application 1646. The preferred embodiment provides a plurality of design tools 1602, 1604, and 1606 for building applications for the run-time execution architecture. These design tools include the standard tools familiar to those skilled in the art, for example, a Structure Chart Editor 1604, a General Document Editor 1606, etc. The functions performed by the design tools were discussed in more detail hereinbefore in conjunction with FIG. 3. Further information is also available in the FOUNDATION ® DESIGN/1 ® manual.

The definitions created by these design tools are stored in a repository 1608. The repository 1608 provides means for categorizing, indexing, and cross-referencing the specifications for user applications. In the preferred embodiment, the repository 1608 supports the informational entities necessary to define the operations to be performed by the Presentation Services, Distribution Services, and Database Access Services.

A Window Painter 1602 defines user interfaces in windowing systems, so that the applications may take advantage of windowing features comprising entry fields, static text, group boxes, radio buttons, check boxes, list boxes, lines, icons, and rectangles. The Window Painter 1602 stores these user interface definitions in the repository 1608.

FIG. 17 describes the preferred structure of a Window Definition entity 1700. The Window Painter 1602 creates this entity 1700 to store window and dialogue box attributes. The Window Definition entity 1700 is comprised of the fields Window Name 1702, Window Class Name 1704, Default Modality 1706, Create On Startup Flag 1708, Menu Indicator 1707, Icon Name 1712, Title 1714, Default Origin 1716, Size 1718, PM Style Bits 1720, Frame Creation Flags 1722, and Initial Focus Widget ID 1724.

FIG. 18 describes the preferred structure of a Window - Menu Relationship entity 1800. The Window Painter 1602 create this entity 1800 to establish the relationship between a window and its pull-down menus or menu items. The Window - Menu Relationship entity 1800 is comprised of the fields of Window Name 1802, Sequence 1804, Menu Type (pull-down or menu item) 1806, and the Name Of The Pull-Down Menu Or Menu Item 1808.

FIG. 19 describes the preferred structure of a Window - Widget Relationship entity 1900. The Window Painter 1602 creates this entity 1900 to establish a relationship between a window and its widgets. The Window - Widget Relationship entity 1900 is comprised of the fields of Window Name 1902, Widget Name 1902, Widget Origin 1906, Widget Size Override 1908, Widget PM Style Attributes Override 1910, Default Attribute, Status, and State 1912, Default Color and Font 1914, Default Message ID 1916, On-Line Help Link 1918, Widget Specific Attributes and Overrides 1920, and C Variable Name Override 1922.

Figure 20:
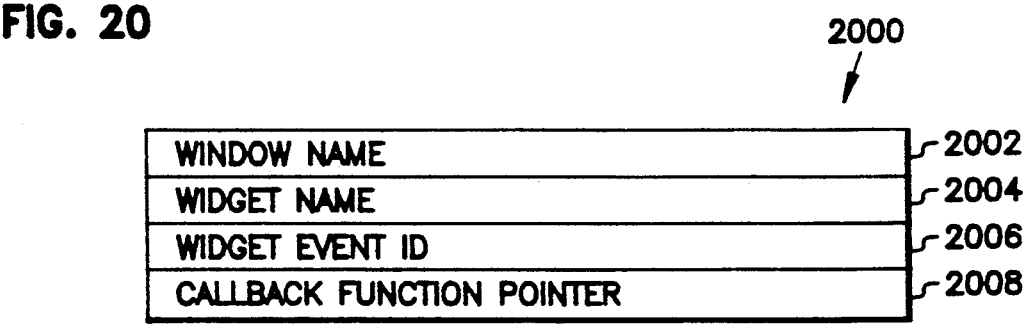
FIG. 20 is a block diagram describing the preferred structure of the window-widget-callback relationship.

FIG. 20 describes the preferred structure of a Window - Widget - Callback Relationship entity 2000. The Window Painter 1602 creates this entity 2000 to establish a tie between a callback function and widget-level events for a specific window. The Window - Widget - Callback Relationship entity 2000 is comprised of the fields of Window Name 2002, Widget Name 2004, Widget Event ID 2006, and Callback Function Pointer 2008.

Figure 21:
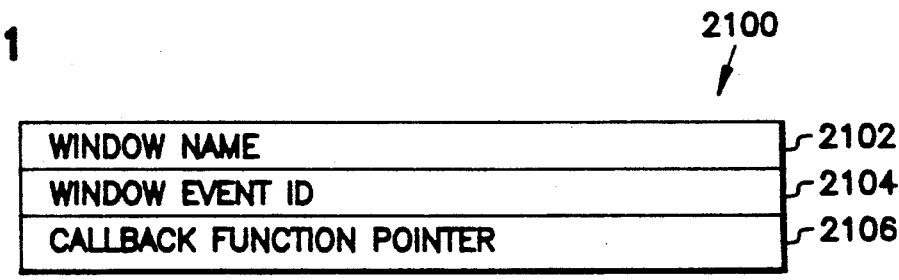
FIG. 21 is a block diagram describing the preferred structure of the window-callback relationship.

FIG. 21 describes the preferred structure of a Window - Callback Relationship entity 2100. The Window Painter 1602 creates this entity 2100 to establish a tie between a callback function and a widget-level event. The Window - Callback Relationship entity 2100 is comprised of the fields of Window Name 2102, Window Event ID 2104, and Callback Function Pointer 2106.

Figure 22:
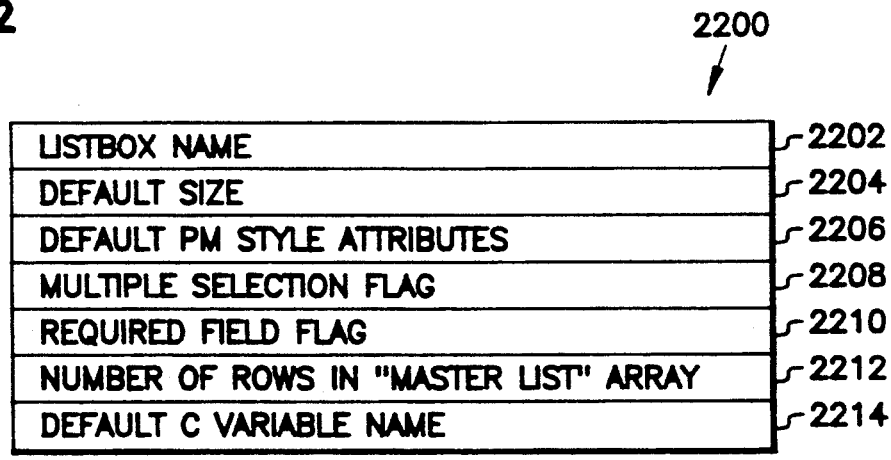
FIG. 22 is a block diagram describing the preferred structure of the listbox definition.

FIG. 22 describes the preferred structure of a Listbox Definition entity 2200. The Window Painter 1602 creates this entity 2200 to define a listbox and its default attributes. The Listbox Definition entity 2200 is comprised of the fields of Listbox Name 2202, Default Size 2204, Default PM Style Attributes 2206, Multiple Selection Flag 2208, Required Field Flag 2210, the Number Of Rows in the "master list" array 2212, and a Default C Variable Name 2214.

Figure 23:
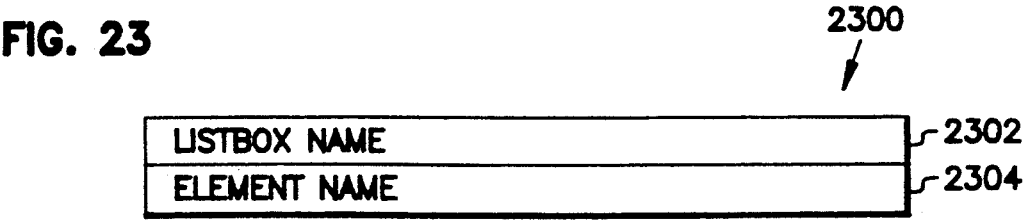
FIG. 23 is a block diagram describing the preferred structure of the listbox-element relationship.

FIG. 23 describes the preferred structure of a Listbox - Element Relationship entity 2300. The Window Painter 1602 creates this entity 2300 to establish a tie between the listbox and the element definitions for its columns. The Listbox - Element Relationship entity 2300 is comprised of the fields of Listbox Name 2302 and Element Name 2304.

FIG. 24 describes the preferred structure of a Push-Button Definition entity 2400. The Window Painter 1602 creates this entity 2400 to define a push-button and is similar to a function key definition. The Push-Button Definition entity 2400 is comprised of the fields of Push-Button Name 2402, Default Size 2404, Default PM Style Attributes 2406, Push-Button Text 2408, Mnemonic Character 2410, Function/Event ID 2412, Preemptive Function Flag 2414, and Default Function State and Attribute 2416.

FIG. 25 describes the preferred structure of a Menu Definition entity 2500. The Window Painter 1602 creates this entity 2500 to define a menu item. The Menu Definition entity 2500 is comprised of the fields of Menu Name 2502, Default PM Style Attributes 2504, Menu Text 2506, Mnemonic Character 2508, Command/Event ID 2510, Preemptive Command Flag 2512, Default Command State and Attribute 2514, Accelerator Character 2516, and Parent Menu Name 2518.

FIG. 26 describes the preferred structure of an Icon Definition entity 2600. The Window Painter 1602 creates this entity 2600 to define a icon. The Icon Definition entity 2608 is comprised of the fields of Icon Type 2602, Resource ID 2604, Filename 2606, and Loading Option 2610. The Icon Type field 2602 identifies the icon. The Resource ID field 2604 is a numeric identifier for the icon. The Filename field 2606 identifies the physical file containing the bit mapped graphic for display. The Loading Option field 2608 specifies dynamic or static linking.

Thus, the Window Painter 1602 is used to define, during the design phase, the window layout, window attributes, literal attributes, widget attributes and callback functions for user applications.

Construction Tools

Referring again to FIGS. 16A and 16B, the preferred embodiment provides Construction Tools 1610, 1612, 1614, 1630, 1632, 1634 and 1644 for generating code shells, executable object modules, and tables for the client and server applications 1646.

A Window Generator 1610 reads window and widget definitions, and other entities, (previously described in FIGS. 17 through 26) from the repository 1608 and generates a number of tables for use by the pre-programmed presentation services, including a Dialogue file 1618, a WES Control Table 1620 (previously described in FIGS. 10A, 10B, and 10C), and a WESMap, Window Dispatch Table (previously described in FIG. 13), Widget Dispatch Table (previously described in FIG. 12), and a Window Definition Table entry (previously described in FIG. 14), all of which are identified by reference number 1622. Note that the Window Generator 1610 generates tables in a format specific to each targeted platform, whereas the Window Painter 1602 creates definitions for the repository 1608 independent of the targeted platform.

The Dialogue file 1618 is preferably a free-form text file containing English-like descriptions of the windows. The descriptions are, in fact, a command language used to define the window. In the preferred embodiment, the Dialogue file 1618 contains the OS/2 Presentation Manager resource file definition and control information for each window. The Dialogue file 1618 contains formatting information for the window as a whole and for each of the items painted on the window, including position, size, default behavior, font information, and other formatting data. The command language is comprised of mnemonics for defining the window title, window id, x and y coordinates on the screen for initial placement, width and height of the window, and other attributes. Those skilled in the art will recognize that other means of generating such resource files could also be used.

The Dialogue file 1618 is used to generate a resource file 1636, which was described hereinbefore by reference number 410 in FIG. 4. Such resource files are well known to those knowledgeable about the IBM OS/2 Presentation Manager operating system and will not be discussed further herein. Similarly, other environments may use other techniques in place of the resource file 1636. The preferred embodiment will support analogous techniques appropriate for each particular environment.

The Window Generator 1610 uses the Window Definition entity 1700 of FIG. 17 to create the corresponding fields of the Window Definition Table 1400 of FIG. 14. The Window Definition entity 1700 of FIG. 17 provides the Window Definition Table 1400 of FIG. 14 with the fields of Window Name 1702 (Window ID 1408 of FIG. 14), Window Class Name 1704 (Window Class Name 1410 of FIG. 14), Default Modality 1706 (Modality 1414 of FIG. 14), Create On Startup Flag 1708 (Create At Startup 1416), Menu Indicator 1710 (Menu ID 1422 of FIG. 14), and Icon Name 1712 (Icon ID 1424 of FIG. 14). The remaining fields, Title 1714, Default Origin 1716, Size, 1718, PM Style Bits 1720, and Frame Creation Flags 1722, are used to build commands in the dialogue file 1618 of FIG. 16A.

The Window Generator 1610 uses the Window - Menu Relationship entity 1800 of FIG. 18 to create the corresponding fields of the Command Table 1100 of FIG. 11. The Window - Menu Relationship entity 1800 provides the fields of Sequence 1804 (Widget ID 1108 of FIG. 11) and Menu Type 1086 (Widget Type 1110 of FIG. 11). The remaining fields, Window Name 1802 and Name Of Pull Down Menu Or Menu Item 1808, are used to build commands in the dialogu file 1618 of FIG. 16A.

The Window Generator 1610 uses the Window - Widget Relationship entity 1900 of FIG. 19 to create the corresponding fields of the WES Control Table 1000 of FIGS. 10A, 10B, and 10C. The Window - Widget Relationship entity 1900 provides the fields of Window Name 1902 (Window ID 1002 of FIG. 10A), Widget Name 1904 (Widget Type 1024 of FIG. 10B), and On-Line Help Link 1918 (Help Link 1034 of FIG. 10B). The remaining fields, Widget Origin 1906, Widget Size Override 1908, Widget PM Style Attributes Override 1910, Default Attribute, Status, and State 1912, Default Color And Font Information 1914, Default Message ID 1916, and Widget Specific Attributes And Overrides 1920, are used to build commands in the dialogue file 1618 of FIG. 16A. The C Variable Name Override 1922 is used within a WESMap to identify a data location therein.

The Window Generator 1610 uses the Window - Widget - Callback Relationship entity 2000 of FIG. 20 to create the corresponding fields of the Widget Dispatch Table 1200 of FIG. 12, which is pointed to by the Window Definition Table 1400 of FIG. 14. The Window - Widget - Callback Relationship entity 2000 provides the fields of Widget Name 2004 (Widget ID 1206 of FIG. 12), Widget Event ID 2006 (Event ID 1208 of FIG. 12), and Callback Function Pointer 2008 (Callback Function Pointer 1210 of FIG. 12) The Window Name 2002 of the Window - Widget - Callback Relationship entity 2000 provides the link between a Window Definition Table 1400 of FIG. 14 and the Widget Dispatch Table 1200 of FIG. 12.

The Window Generator 1610 uses the Window - Callback Relationship entity 2100 of FIG. 21 to create the corresponding fields of the Window Dispatch Table 1300 of FIG. 13, which is pointed to by the Window Definition Table 1400 of FIG. 14. The Window - Callback Relationship entity 2100 provides the fields of Window Event ID 2104 (Event ID 1306 of FIG. 13) and Callback Function Pointer 2106 (Callback Function Pointer 1308 of FIG. 13). The Window Name 2102 of the Window - Callback Relationship entity 2100 provides the link between a Window Definition Table 1400 of FIG. 14 and the Window Dispatch Table 1300 of FIG. 13.

The Window Generator 1610 uses the Listbox Definition entity 2200 of FIG. 22 to create the corresponding fields of the WES Control Table 1000 of FIGS. 10A, 10B, and 10C. The Listbox Definition entity 2200 provides the fields of Listbox Name 2202 (Widget Type 1024 of FIG. 10B), Default Size 2204 (WESMap Length 1028 of FIG. 10A), Multiple Selection Flag 2208 (Multiple Selection Flag 1062 of FIG. 10C), Required Field Flag 2210 (Required Field Flag 1054 of FIG. 10C), and the Number Of Rows In Master List Array 2212 (Number Of Rows In Master List Array 1058 of FIG. 10C). The remaining fields, Default Size 2204 and Default PM Style Attributes 2206, are used to build commands in the dialogue file 1618 of FIG. 16A. The Default C Variable Name 2214 is used within a WESMap to identify a data location therein.

The Window Generator 1610 uses the Listbox - Element Relationship entity 2300 of FIG. 23 to create corresponding fields in the dialogue file 1618 of FIG. 16A. The Listbox Name 2302 provides a link to the Listbox Definition entity 2200 of FIG. 22. The Element Name 2304 provides a name for the entry in the dialogue file 1618 of FIG. 16A.

The Window Generator 1610 uses the Push-Button Definition entity 2400 of FIG. 24 to create the corresponding fields of the Command Table 1100 of FIG. 11. The Push-Button Definition entity 2400 provides the fields of Push-Button Name 2402 (Widget ID 1108 of FIG. 11), Preemptive Command Flag 2414 (Preemptive Command Flag 1112 of FIG. 11), and Default Command State and Attribute 2416 (Command Attribute 1116 of FIG. 11). The remaining fields, Default Size 2404, Default PM Style Attributes 2406, Push-Button Text 2408, and Mnemonic Character 2410, are used to build commands in the dialogue file 1618 of FIG. 16A.

The Window Generator 1610 uses the Menu Definition entity 2500 of FIG. 25 to create the corresponding fields of the Command Table 1000 of FIG. 11. The Menu Definition entity 2500 provides the fields of Menu Name 2502 (Widget ID 1108 of FIG. 11), Command/Event ID 2510 (Command Id 1106 of FIG. 11), Preemptive Command Flag 2512 (Preemptive Command Flag 1112 of FIG. 11), and Default Command State and Attribute 2514 (Command Attribute 1116 of FIG. 11). The Menu Parent Name 2518 provides link for the different levels of menus, sub-menus, etc.

Figure 28:
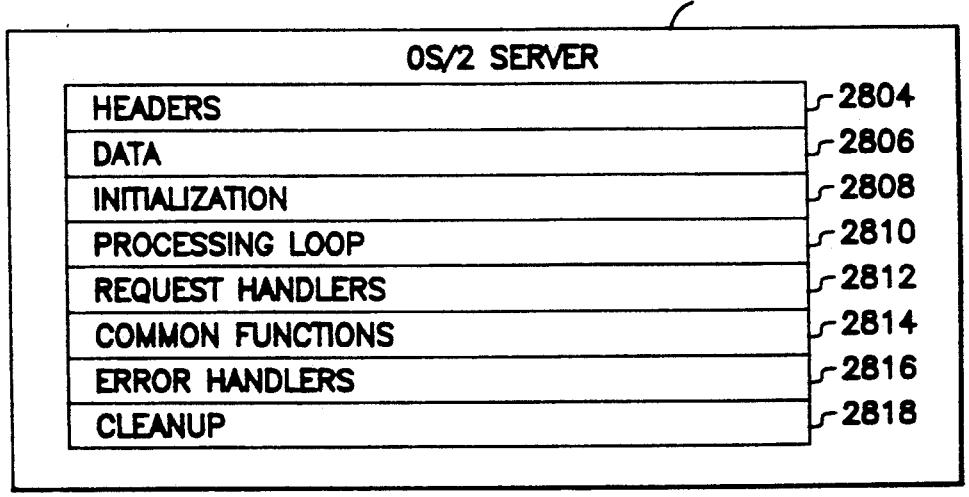

The Window Generator 1610 uses the Icon Definition entity 2800 of FIG. 28 to create the corresponding fields of the Window Definition Table 1400 of FIG. 14. The Icon Definition entity 2800 provides the fields of Icon Type 2802 (Icon ID 1424 of FIG. 14) and Resource ID 2804 (Dialogue Resource ID 1420 of FIG. 14). The remaining fields, Filename 2806 and Loading Option 2808, are used to build commands in the dialogue file 1618 of FIG. 16A.

Referring again to FIG. 16A, a Code Generator 1612 uses the structure charts stored in the repository 1608 to generate the functions found in the application callback source code 1624. Alternatively, users may also manually program functions into the application callback source code at point 1626 in FIG. 16A. Functions are typically designed using the FOUNDATION ® Structure Chart Editor. Once the user has completed the Structure Charts for the required functions, the native source code for these functions can be generated.

The process of generating native source code consists of reading the Structure Chart definitions from the repository 1608, then translating those definitions using a Spec-Language Translator. The Translator functions logically within the Code Generator 1612 according to FIG. 16A, but in the preferred embodiment actually is a physically distinct program. The Spec-Language Translator generates a standard language equivalent, e.g., C, COBOL, etc. Thus, it is the responsibility of the Code Generator 1612 to build the file used to create the actual executable code. The output file of the Code Generator 1612 is the source file for the user application.

Alternatively, users may enter native source code manually. By building functions using a standard programming language such as COBOL, C, etc., users thus eliminate the need for the Spec-Language Translator.

As is well known in the art, the specifications for data structures are created by the FOUNDATION ® Dataflow Diagrammer and then stored in the repository 1608. Alternatively, the specifications for data structures can be created using a general document editor without diagramming.

A Copybook Generator 1614 reads data structure specifications and other entities from the repository 1608 and generates language-specific copybooks 1628. These copybooks 1628 contain the source code structures for using the Message Header, data structures, etc.

A Backbone Generator 1632 combines the Window Dispatch Table, Widget Dispatch Table, Window Definition Table and a WESMap structure, together referred to as 1622, the application callback source code 1624, and the copybooks 1628 to create the command files used to create the actual executable code. The output files of Backbone Generator are the source file with include references and a 'make' file (on workstations and other platforms where they are used) for compiling each module of the program, which is input to the Compiler 1634 and an application resource file 1616.

A standard Compiler 1634, for example, a C or COBOL compiler, takes the output file from the Backbone Generator and creates the program object code 1638 for the user application.

A Resource Compiler 1630 uses the application resource file 1616 and dialogue file 1618 to create an Resource File 1636. The application resource file 1616 indicates which window definitions should be extracted from the dialogue file 1618 for inclusion in the Resource File 1636. The dialogue file 1618 contains formatting information for the window as a whole and for each of the items painted on the window. As described above, formatting information includes position, size, default behavior, font information, and other formatting data. Generally, the Resource Compiler 1630 is used only for applications which have a user interface, i.e., a client application. For some applications which do not have a user interface, e.g., server applications, the Resource Compiler 1630 may not be required.

A standard Linker 1644 joins the program object 1638, a shell object 1640, and an application library object 1642 into an application executable object module 1646. The shell object 1640 is a standard object module containing the "main" procedure of the application and global data pointers. The application library object 1642 is a standard object module containing commonly-used functions. Once linked, the executable object module 1646 includes the modules or routines to access them described hereinbefore in FIG. 3, including the pre-programmed presentation services (if a client application), the user-specified functions, the pre-programmed distribution services, the pre-programmed server-front end (if a server application), and the database access services (if a server application).

Figure 27:
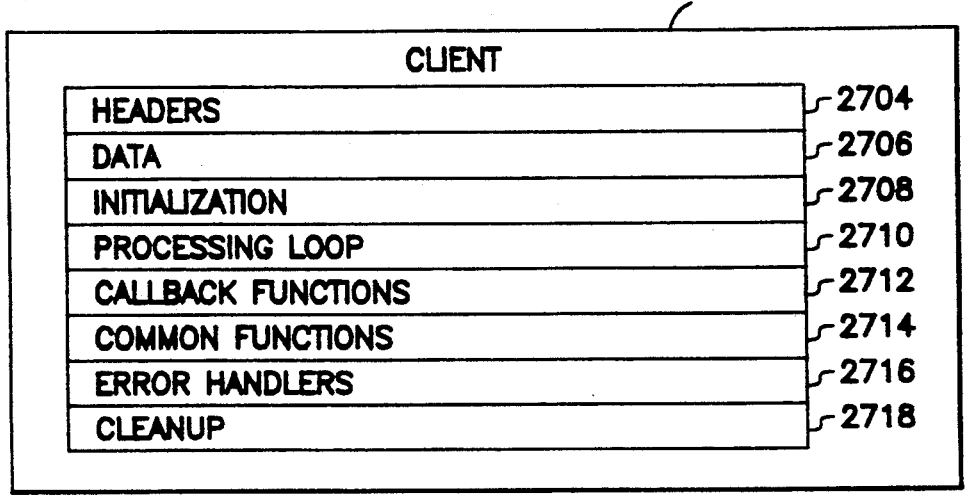
FIGS. 27, 28, and 29 show the preferred structure of the generated code shells.
Figure 29:
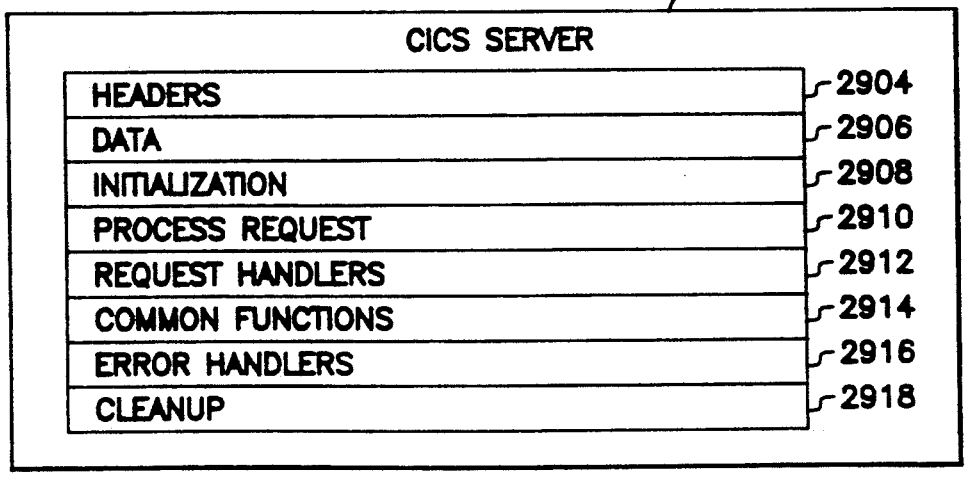

FIGS. 27, 28, and 29 shows the preferred structure of the user applications as they are generated by the construction tools. FIG. 27 shows the preferred run-time structure for a client application 2702. The client application 2702 is comprised of headers 2704, data 2706, initialization 2708, processing loop 2710, callback functions 2712, common functions 2714, error handlers 2716, and cleanup 2718. The headers 2704 are declarations of constants and data structures. These declarations come primarily from the copybooks. The data 2706 is working storage variables. The initialization 2708 is comprised of setup routines. The processing loop 2710 is a loop which performs two functions: (1) retrieving messages from the Distribution Services, and (2) dispatching messages based on the function requested. The callback functions 2712 are the functions called by WES or by the run-time execution architecture in response to events not originating from the user interface. The common functions 2714 are functions not directly called by the user interface, i.e., WES. The error handlers 2716 are functions which perform error processing. The cleanup 2718 performs various cleanup routines pending the termination of a client 2702.

FIG. 28 describes the preferred run-time structure 2802 for an OS/2 server application. The run-time structure 2802 comprises headers 2804, data 2806, initialization 2808, processing loop 2809, request handlers 2810, common functions 2812, error handlers 2814, and cleanup 2816. These functions are similar to those described in the client run-time structure 2702 of FIG. 27. The differences are in the processing loop 2810, request handlers 2812, and common functions 2814. The processing loop 2810 reads a request queue and invokes a procedure based on the type of request received. The request handlers 2812 are the functions called by the processing loop 2810 used on the type of request. The common functions 2814 are functions not directly called by the processing loop 2810.

FIG. 29 describes the preferred run-time structure 2902 for a CICS server application. The run-time structure 2902 includes headers 2904, data 2906, initialization 2908, process requests 2910, request handlers 2912, common functions 2914, error handlers 2916, and cleanup 2918. This run-time structure 2902 is similar in function to the OS/2 run-time structure 2702 described in FIG. 27.

Shared Data Manager

A. Overview

Figure 30:
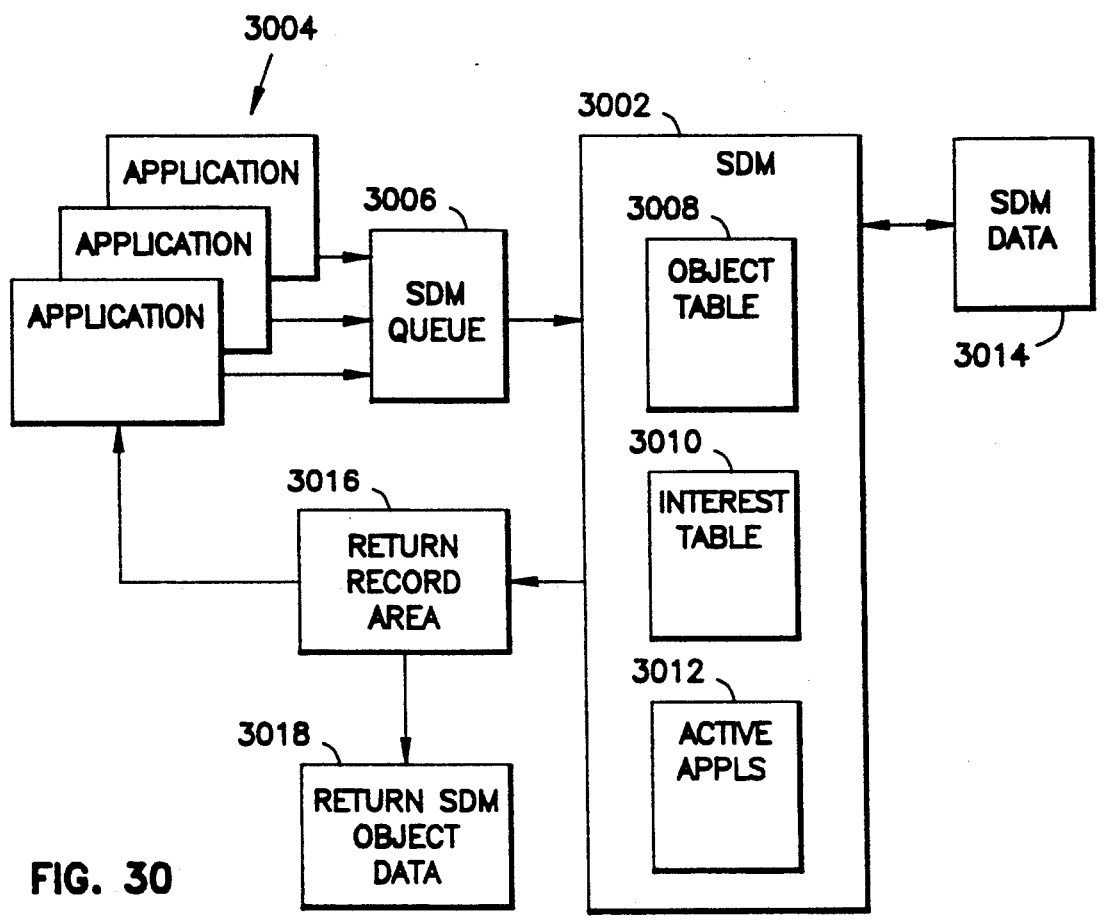
FIG. 30 describes a preferred embodiment of a Shared Data Manager which provides facilities for applications to access a common pool of information and register interest in the pool's objects.

FIG. 30 describes a Shared Data Manager (SDM) 3002 facility, which in the preferred embodiment provides applications 3004 in the execution architecture with an ability to access a common pool of information. The SDM 3002 stores information in the form of 'objects' classified by a business function, class and instance. In addition to being able to manipulate these objects, applications 3004 can also register interest in them so that if an object data is updated or deleted, the interested applications are notified of the change. The implementation of SDM described herein is just one possible implementation, and those skilled in the art will readily recognize that other implementations could be used.

B. SDM Viewpoint

In the preferred embodiment, the SDM 3002 is a 'server' application. Objects and the associated data are maintained internally in the SDM 3002 in various tables and linked lists. These tables and liked lists preferably comprise an object table 3008, an interest table 3010, and an active application list 3012. The object table 3008 typically maintains a copy of the desired data object. The interest table 3010 typically maintains an indicator of an application's interest in a particular object. The active application table 3012 typically maintains a list of all active applications 3004 having access to the SDM 3002.

The tables and lists 3008, 3010, and 3012 are organized into a key-sequenced hierarchical data access structure. Those skilled in the art will recognize that other data access structures may be substituted therefor. Preferably, the tables and lists 3008, 3010, and 3012 are resident in memory, thus permitting fast access to object data. The SDM 3002 also preferably makes an efficient use of the available memory by initially allocating only enough memory to hold a limited number of objects and then dynamically resizing its internal tables 3008, 3010, and 3012 to hold more data if necessary.

In some operating systems environments, for example OS/2, it is possible to spawn an asynchronous thread to process every application request received. Thus, in the preferred embodiment, the SDM 3002 takes sufficient precautions to maintain the integrity of the internal tables 3008, 3010, and 3012, and to prevent data from being manipulated by multiple requests at the same time.

C. Application Viewpoint

In the preferred embodiment, each object in the object table 3008 is uniquely identified by business function, class and instance. In an alternative embodiment, the SDM 3002 may also permit objects to be identified non-uniquely. Thus, in the alternative embodiment, operations may be performed on multiple objects at a time, thus eliminating the need for the application to identify an object by its unique identification. This alternative embodiment could support operations on multiple objects by accepting partial identification of classes of objects.

In the preferred embodiment, an application 3004 communicates with the SDM 3002 by sending it a message via the SDM queue 3006. A return message 3016 is sent by the SDM 3002 to the requesting application 3004 upon completion of the request. This return message 3016 tells the application 3004 whether the SDM 3002 was able to carry out the requested service successfully. The return message 3016 also contains any data 3018 requested by the application 3004, if the service performed was successful.

A message between an application 3004 and the SDM 3002 preferably consists of two parts: (1) a parameter block which identifies the service to be performed by SDM, and (2) an area containing additional information (e.g., object data) required to perform the requested service.

In the preferred embodiment, the SDM 3002 can perform a number of operations on its table of objects including: Read, Write, Rewrite, Delete, and Unregister Interest.

The Read service allows an application 3004 to read an existing object 3008 from the SDM 3002. An object in the object table 3008 is uniquely identified by its Business Function, Class and Instance key. If the requested object is present in the object table 3008, a copy of the object data is sent to the requesting application 3004. The application 3004 also becomes implicitly 'interested' in that object, wherein that interest is recorded in the interest table 3010.

The Write service allows applications 3004 to add an object to the object table 3008. If the object does not already exist in the object table 3008, it is added thereto. The requesting application 3004 also becomes automatically 'interested' in that object, wherein that interest is recorded in the interest table 3010.

The Rewrite service permits an existing object to be modified in the object table 3008. Note that all interested applications 3004 are notified of this change, except for the requesting application 3004. Applications 3004 are notified by receiving a message from the SDM 3002, with the message indicating the object's new value. Alternative embodiments could use alternative techniques of notification.

The Delete service allows an object to be deleted from the object table 3008. As with the Rewrite service, all interested applications 3004 are notified of this change, except for the requesting application 3004.

The Unregister Interest service permits an application 3004 which is no longer 'interested' in a particular object to 'unregister' itself from the interest table 3010. The application 3004 will not receive any further notification of change in that particular object in the object table 3008. If there are no interested applications 3004 in an object, then the object is deleted from the object table 3010. Applications 3004 can also unregister themselves from all the objects they are interested in by specifying a 'null' Business Function, Class and Instance with this service, thereby signifying all objects.

Those skilled in the art will recognize that this list of functions could be added to or modified without significantly affecting the overall workings of the SDM 3002.

D. Browser Tool

In the preferred embodiment, a Browser Tool is provided to allow a programmer to open a window to the SDM internal tables 3008, 3010, and 3012 and view the contents thereof. Thus, the Browser Tool can retrieve a list of user applications 3012, interests of the applications 3010, and data objects 3008 from the SDM 3002. The Browser Tool allows a programmer to change data values dynamically during execution using a modify function. Such an action triggers the notification facilities of the SDM so that all interested applications 3004 are notified of the change. The Browser Tool communicates with the SDM 3002 in a manner similar to user applications 3004.

Codes Tables

In the preferred embodiment, the run-time execution architecture also has a feature for parameterizing applications. To parameterize an application, a data item is identified as an element of a "codes table" wherein values of the element are maintained in the codes tables. An application requests a "decode" by passing an identifier of the element to the codes table and a function to be performed thereon. The codes table performs the desired operation. The codes table provides a central control point for messages, data and validation operations. Any number of codes tables can be automatically invoked by the application during the editing and validation of data. The preferred embodiment also provides tools for maintaining the codes tables.

A Overview

Figure 31:
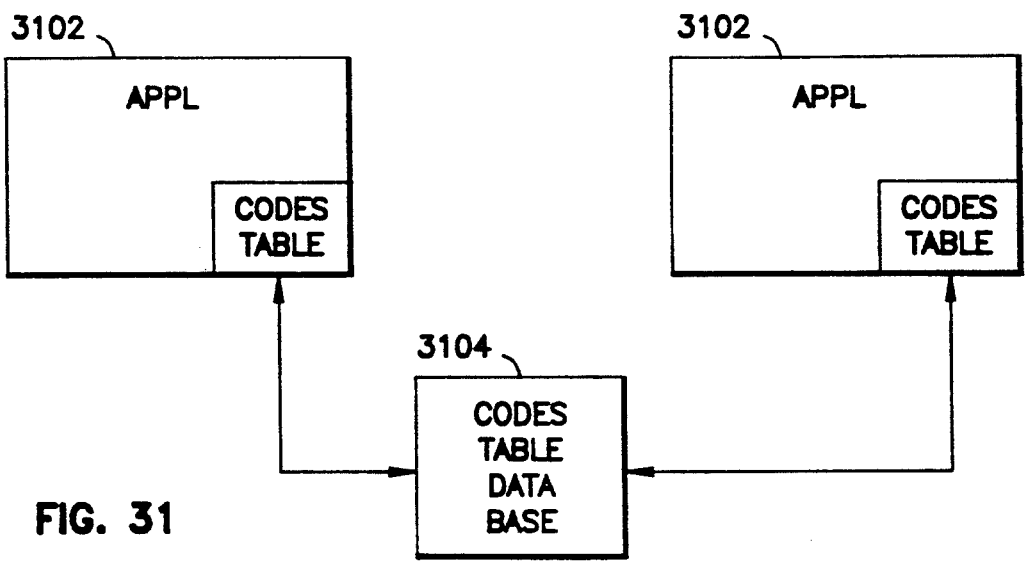
FIG. 31 describes a preferred embodiment of a codes table which is used by applications to reference commonly used data and provide validation therefor.

As illustrated in FIG. 31, codes tables 3104 are typically used by applications 3102 to "decode" requests for commonly used data and provide validation. Some typical uses of a codes table 3104 are:

Informational messages
Warning messages
Error messages
Validation of abbreviations
Range validation
Validation of combinations
Abbreviation lookup B. Application Programming Interface The typical functions available for use with the codes table 3104 are listed below along with a brief description:

| Function | Results |
|---|---|
| Get Unique | Returns desired element. |
| Get Next | Returns next element. |
| Get Multiple | If full key exists, the element identified thereby will be returned. Otherwise, the next element is returned. |
| Get Decode | Returns decode field. |
| Write | Insert new element. |
| Rewrite | Modify the specified element. |
| Delete | Delete the specified element. |

Additional functions could be added without departinq from the scope of the invention.

For all of the functions, a return code is set by the codes tables facility to the status of the operation. For example, a successful completion would be given a 0, warnings a 4, etc. In addition, error messages may be sent to an operator's console.

It may be desirable to have all or some of the codes table information loaded onto the computer system where an application resides during initialization. The timestamp of the codes table may be automatically checked and a new codes table copied over it if necessary. This would avoid having to request the decode from a remote server residing on another computer system for every decode request. The decision to place all of the codes table information on the local computer system where the application resides depends on the size of the table.

It is also possible to keep only the most frequently requested decodes with the application. The codes table facility is called by the application program and based on the requested decode, it is determine whether a remote server should be accessed to perform the decode.

F. Codes Table Maintenance Facility

The Codes Table Maintenance facility provides an interface to the elements of the codes table. Each decode record or element of the codes table preferably contains the following fields:

decode value—An integer value uniquely identifying the element.

resident flag—A boolean flag indicating whether the decode record should be considered to be locally resident.

description—Text describing the purpose of the decode record.

decode string—The text associated with a particular decode record including the substitution place markers (%1, %2, ... ) for the substitution of parameters into the decode string.

parameter count—The maximum number of substitution parameters allowed.

parameter list—The type of data (string, integer, byte, word, pointer ... ) and a required parameter flag associated with each parameter.

Thus, the Codes Table Maintenance Facility provides a way for users to modify codes tables. For example, a list of codes table decode elements and their associated descriptions can be scrolled through on a display screen. Selecting a modify function allows the attributes of a decode element in a codes table to be changed.

CONCLUSION

This concludes the description of the preferred embodiment of the invention. The following paragraphs describe some alternative methods of accomplishing the same invention.

A different workstation environment such as UNIX could be substituted for the OS/2 environment described. A different mainframe or minicomputer environment could also be substituted for the IBM CICS environment described.

In summary, a computer-assisted software engineering system has been described which facilitates the design, implementation, and execution of applications in cooperative processing environments. Design tools are provided for creating, storing, retrieving, and editing system specifications in a repository. Construction tools are provided for generating applications from the systems specification created by the design tools. A run-time execution architecture is provided for executing the applications on a plurality of computer hardware and operating system platforms and for easily porting applications between different platforms. The run-time execution architecture comprises pre-programmed presentation services for interacting with the user and pre-programmed distribution services for routing and transferring messages between applications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-assisted software engineering system for cooperative processing environments, comprising:
   (a) design means for creating, storing, retrieving, and editing specifications describing a first user application in an electronic data format;
   (b) construction means for generating the first user application from the specifications, the first user application being capable of execution on one of a plurality of computer hardware platforms; and
   (c) run-time execution architecture means for executing the first user application on the computer hardware platforms, the run-time execution architecture means comprising:
      (i) pre-programmed presentation services means for managing a plurality of user-interface functions for the first user application;
      (ii) pre-programmed distribution services means for routing and transferring messages between the first user application and a second user application; and
      (iii) user-programmed application services means for implementing user-defined functions in the first user application.

2. The software engineering system of claim 1, wherein the design means further comprises window painter means for defining and storing a user-interface comprising push-buttons, pull down menus, resizable windows, and text entry fields.

3. The software engineering system of claim 2, wherein the construction means comprises window generator means, responsive to the user-interface generated by the window painter means, for generating tables for use by the run-time presentation services means in the display and management of the user interface.

4. The computer-assisted software engineering system of claim 1, further comprising:
   (a) means for storing at least one data item in a global pool of data;
   (b) means for modifying and retrieving data items in the global pool of data;
   (c) means for registering an interest by the first user application in one of the data items; and
   (d) means for notifying the first user application when the data item is modified in the global pool of data.

5. The computer-assisted software engineering system of claim 4, further comprising means for sharing the global pool of data between the first and second user applications executing on separate hardware platforms.

6. The computer-assisted software engineering system of claim 4, wherein the first user application comprises a user-interface window.

7. The computer-assisted software engineering system of claim 1, wherein the run-time execution architecture means further comprises means for parameterizing the first user application so that a plurality of codes tables can be automatically invoked by the first user application during the editing and validation of data.

8. The computer-assisted software engineering system of claim 7, wherein the means for parameterizing comprises means for identifying a data item as an element of the codes table and means for maintaining the values of the element in the codes table.

9. The computer-assisted software engineering system of claim 7, wherein the means for parameterizing further comprises browser tool means for editing and maintaining the codes tables.

10. The computer-assisted software engineering system of claim 1, wherein the pre-programmed presentation services means further comprises means for presenting a window to the first user application as a memory model so that a window field is treated as a variable in the memory model, so that data which is altered in the variable is thus altered in the window field, and so that data which is altered in the window field is thus altered in the variable in the memory model.

11. The computer-assisted software engineering system of claim 10, wherein the pre-programmed presentation services means further comprises means for transparently presenting commands to the first user application as a callback function in the first user application so that the first user application need not control the presentation format of the commands.

12. The computer-assisted software engineering system of claim 11, wherein the means for transparently presenting further comprises means for performing the callback function identically on a plurality of platforms without re-programming the callback function.

13. The computer-assisted software engineering system of claim 1, wherein the pre-programmed distribution services means further comprises means for automatically routing and transferring messages according to a service being requested.

14. The computer-assisted software engineering system of claim 13, wherein the means for automatically routing comprises:
   (a) means for determining a location of the service;
   (b) means for routing the message to the location; and
   (c) means for returning a reply to the message from the service at the location to the user application.

15. A shared data manager for sharing data among a plurality of application programs executing on a computer, comprising:
   (a) means for storing at least one data item in a global pool of data;
   (b) means for modifying and retrieving data items in the global pool of data;
   (c) means for registering an interest by a first application program in one of the data items;
   (d) means for notifying the first application program when the data item is modified in the global pool of data; and
   (e) means for sharing the global pool of data between the first and a second application programs executing on a separate computer.

* * * * *

UNITED STATES PATENT AND TRADEMARK OFFICE
CERTIFICATE OF CORRECTION

PATENT NO. : 5,301,270
DATED : April 5, 1994
INVENTOR(S) : Steinberg et al.

It is certified that error appears in the above-identified patent and that said Letters Patent is hereby corrected as shown below:

On the title page, item [73] Assignee, delete "Anderson" and insert --Andersen--.

Signed and Sealed this

Thirteenth Day of September, 1994

Attest:

BRUCE LEHMAN

Attesting Officer     *Commissioner of Patents and Trademarks*